(12) United States Patent
Abdallah

(10) Patent No.: US 10,241,795 B2
(45) Date of Patent: *Mar. 26, 2019

(54) GUEST TO NATIVE BLOCK ADDRESS MAPPINGS AND MANAGEMENT OF NATIVE CODE STORAGE

(71) Applicant: Intel Corporation, Santa Clara, CA (US)

(72) Inventor: Mohammad Abdallah, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/208,404

(22) Filed: Jul. 12, 2016

(65) Prior Publication Data

US 2016/0321077 A1 Nov. 3, 2016

Related U.S. Application Data

(63) Continuation of application No. 13/359,832, filed on Jan. 27, 2012, now Pat. No. 9,639,364.

(Continued)

(51) Int. Cl.
*G06F 9/355* (2018.01)
*G06F 12/1036* (2016.01)
(Continued)

(52) U.S. Cl.
CPC .......... *G06F 9/355* (2013.01); *G06F 9/30054* (2013.01); *G06F 9/30174* (2013.01);
(Continued)

(58) Field of Classification Search
CPC ............... G06F 9/4552; G06F 12/1063; G06F 9/30174; G06F 12/1036; G06F 9/322;
(Continued)

(56) References Cited

U.S. PATENT DOCUMENTS

| 5,053,952 A | 10/1991 | Koopman, Jr. et al. |
| 5,396,448 A | 3/1995 | Takayanagi et al. |

(Continued)

FOREIGN PATENT DOCUMENTS

| CN | 1823323 A | 8/2006 |
| CN | 101506773 A | 8/2009 |

(Continued)

OTHER PUBLICATIONS

Final Office Action from U.S. Appl. No. 13/359,832, dated May 27, 2014, 24 pages.

(Continued)

*Primary Examiner* — Hashem Farrokh
(74) *Attorney, Agent, or Firm* — NDWE LLP

(57) ABSTRACT

A method for managing mappings of storage on a code cache for a processor. The method includes storing a plurality of guest address to native address mappings as entries in a conversion look aside buffer, wherein the entries indicate guest addresses that have corresponding converted native addresses stored within a code cache memory, and receiving a subsequent request for a guest address at the conversion look aside buffer. The conversion look aside buffer is indexed to determine whether there exists an entry that corresponds to the index, wherein the index comprises a tag and an offset that is used to identify the entry that corresponds to the index. Upon a hit on the tag, the corresponding entry is accessed to retrieve a pointer to the code cache memory corresponding block of converted native instructions. The corresponding block of converted native instructions are fetched from the code cache memory for execution.

15 Claims, 19 Drawing Sheets

Related U.S. Application Data

(60) Provisional application No. 61/436,957, filed on Jan. 27, 2011.

(51) Int. Cl.
- *G06F 9/455* (2018.01)
- *G06F 9/30* (2018.01)
- *G06F 9/32* (2018.01)
- *G06F 9/38* (2018.01)
- *G06F 12/0895* (2016.01)
- *G06F 12/0897* (2016.01)

(52) U.S. Cl.
CPC ............ *G06F 9/322* (2013.01); *G06F 9/3802* (2013.01); *G06F 9/4552* (2013.01); *G06F 12/0895* (2013.01); *G06F 12/0897* (2013.01); *G06F 12/1036* (2013.01); *G06F 2212/604* (2013.01)

(58) Field of Classification Search
CPC ............ G06F 12/0895; G06F 12/0897; G06F 2212/604; G06F 9/355; G06F 9/30054; G06F 9/3802
USPC .......................................................... 711/3
See application file for complete search history.

(56) References Cited

U.S. PATENT DOCUMENTS

| | | |
|---|---|---|
| 5,546,552 A | 8/1996 | Coon et al. |
| 5,623,617 A | 4/1997 | Davidian |
| 5,651,124 A | 7/1997 | Shen et al. |
| 5,651,135 A | 7/1997 | Hatakeyama |
| 5,742,802 A | 4/1998 | Harter et al. |
| 5,784,638 A | 7/1998 | Goetz et al. |
| 5,870,575 A | 2/1999 | Kahle et al. |
| 5,893,121 A | 4/1999 | Ebrahim et al. |
| 5,953,520 A | 9/1999 | Mallick |
| 5,956,495 A | 9/1999 | Kahle et al. |
| 5,995,743 A | 11/1999 | Kahle et al. |
| 6,138,225 A * | 10/2000 | Upton ................. G06F 12/1027 711/128 |
| 6,142,682 A | 11/2000 | Skogby |
| 6,202,127 B1 | 3/2001 | Dean et al. |
| 6,205,545 B1 | 3/2001 | Shah et al. |
| 6,305,013 B1 | 10/2001 | Miyamoto |
| 6,463,582 B1 | 10/2002 | Lethin et al. |
| 6,594,728 B1 | 7/2003 | Yeager et al. |
| 6,711,672 B1 | 3/2004 | Agesen |
| 6,813,763 B1 | 11/2004 | Takahashi et al. |
| 6,898,699 B2 | 5/2005 | Jourdan et al. |
| 6,928,641 B1 * | 8/2005 | Szewerenko ............. G06F 8/70 717/159 |
| 7,069,413 B1 | 6/2006 | Agesen et al. |
| 7,080,366 B2 | 7/2006 | Kramskoy et al. |
| 7,107,437 B1 | 9/2006 | Padwekar |
| 7,111,145 B1 | 9/2006 | Chen et al. |
| 7,203,932 B1 | 4/2007 | Gaudet et al. |
| 7,225,436 B1 | 5/2007 | Patel |
| 7,278,030 B1 | 10/2007 | Chen et al. |
| 7,428,626 B2 | 9/2008 | Vega et al. |
| 7,568,189 B2 | 7/2009 | Suba et al. |
| 7,571,090 B2 | 8/2009 | Kinney |
| 7,577,944 B2 | 8/2009 | De Dinechin et al. |
| 7,590,982 B1 | 9/2009 | Weissman |
| 7,613,903 B2 | 11/2009 | Yoshida |
| 7,617,493 B2 | 11/2009 | Mitran et al. |
| 7,644,210 B1 | 1/2010 | Banning et al. |
| 7,734,895 B1 * | 6/2010 | Agarwal ................... G06F 8/52 712/13 |
| 7,752,417 B2 | 7/2010 | Manczak et al. |
| 7,877,741 B2 | 1/2011 | Lin et al. |
| 8,099,730 B2 | 1/2012 | Wang et al. |
| 8,131,534 B2 | 3/2012 | Kinney |
| 8,190,664 B2 | 5/2012 | Lundvall et al. |
| 8,301,434 B2 | 10/2012 | Bohizic et al. |
| 8,370,819 B2 | 2/2013 | Chakraborty et al. |
| 8,428,930 B2 | 4/2013 | Bohizic et al. |
| 8,438,334 B2 | 5/2013 | Bell, Jr. et al. |
| 8,555,041 B2 | 10/2013 | Renno et al. |
| 8,561,040 B2 | 10/2013 | Rose |
| 8,589,143 B2 | 11/2013 | Koh et al. |
| 8,769,241 B2 | 7/2014 | Chiang et al. |
| 8,799,879 B2 | 8/2014 | Wright et al. |
| 8,819,647 B2 | 8/2014 | Mitran et al. |
| 8,832,354 B2 | 9/2014 | Sokolov et al. |
| 8,959,277 B2 | 2/2015 | Vick et al. |
| 9,158,566 B2 | 10/2015 | Bohizic et al. |
| 9,207,960 B2 | 12/2015 | Abdallah |
| 9,542,187 B2 | 1/2017 | Abdallah et al. |
| 2001/0013093 A1 | 8/2001 | Banno et al. |
| 2001/0037492 A1 | 11/2001 | Holzmann |
| 2002/0042863 A1 | 4/2002 | Jeddeloh |
| 2002/0066081 A1 | 5/2002 | Duesterwald et al. |
| 2002/0066083 A1 | 5/2002 | Patel et al. |
| 2002/0083302 A1 | 6/2002 | Nevill et al. |
| 2002/0100022 A1 | 7/2002 | Holzmann |
| 2002/0138712 A1 | 9/2002 | Yoshida |
| 2002/0194464 A1 | 12/2002 | Henry et al. |
| 2002/0199091 A1 | 12/2002 | Tago et al. |
| 2003/0046519 A1 | 3/2003 | Richardson et al. |
| 2003/0120906 A1 | 6/2003 | Jourdan et al. |
| 2003/0191792 A1 | 10/2003 | Waki et al. |
| 2004/0044880 A1 | 3/2004 | Altman et al. |
| 2004/0128658 A1 | 7/2004 | Lueh et al. |
| 2004/0133760 A1 | 7/2004 | Thimmannagari et al. |
| 2004/0154006 A1 | 8/2004 | Heishi et al. |
| 2005/0240731 A1 | 10/2005 | Steely et al. |
| 2006/0026365 A1 | 2/2006 | Yamazaki |
| 2006/0026408 A1 | 2/2006 | Morris et al. |
| 2006/0117308 A1 | 6/2006 | Hirayanagi et al. |
| 2006/0206687 A1 | 9/2006 | Vega et al. |
| 2006/0224816 A1 * | 10/2006 | Yamada ................. G06F 12/109 711/6 |
| 2007/0006178 A1 | 1/2007 | Tan |
| 2007/0079296 A1 | 4/2007 | Li et al. |
| 2007/0124736 A1 | 5/2007 | Gabor et al. |
| 2007/0174717 A1 | 7/2007 | Vamsee et al. |
| 2007/0234358 A1 | 10/2007 | Hattori et al. |
| 2007/0283125 A1 | 12/2007 | Manczak et al. |
| 2008/0028195 A1 | 1/2008 | Kissell et al. |
| 2008/0288238 A1 | 11/2008 | Heller, Jr. |
| 2008/0301420 A1 | 12/2008 | Inoue |
| 2008/0320286 A1 | 12/2008 | Campbell et al. |
| 2009/0007105 A1 | 1/2009 | Fries et al. |
| 2009/0049234 A1 | 2/2009 | Oh et al. |
| 2009/0089488 A1 | 4/2009 | Yasui |
| 2009/0119493 A1 | 5/2009 | Venkitachalam et al. |
| 2009/0164991 A1 | 6/2009 | Takashige et al. |
| 2009/0172642 A1 * | 7/2009 | Lai ....................... G06F 11/3636 717/124 |
| 2009/0182973 A1 | 7/2009 | Greiner et al. |
| 2009/0182985 A1 | 7/2009 | Greiner et al. |
| 2009/0187697 A1 | 7/2009 | Serebrin |
| 2009/0187731 A1 * | 7/2009 | Deutschle ........... G06F 12/0888 711/207 |
| 2009/0187902 A1 | 7/2009 | Serebrin |
| 2009/0228882 A1 | 9/2009 | Wang et al. |
| 2009/0248611 A1 | 10/2009 | Xu et al. |
| 2009/0254709 A1 | 10/2009 | Agesen |
| 2009/0300263 A1 | 12/2009 | Devine et al. |
| 2009/0300645 A1 | 12/2009 | Devine et al. |
| 2010/0058358 A1 * | 3/2010 | Franke ................. G06F 12/1027 719/319 |
| 2010/0115497 A1 | 5/2010 | Das et al. |
| 2010/0153662 A1 | 6/2010 | Vick et al. |
| 2010/0153690 A1 | 6/2010 | Vick et al. |
| 2010/0161875 A1 | 6/2010 | Chang et al. |
| 2010/0274973 A1 | 10/2010 | Balakrishnan et al. |
| 2010/0275049 A1 | 10/2010 | Balakrishnan et al. |
| 2010/0333090 A1 | 12/2010 | Wright et al. |
| 2011/0023027 A1 | 1/2011 | Kegel et al. |
| 2011/0071814 A1 | 3/2011 | Bohizic et al. |

(56) References Cited

U.S. PATENT DOCUMENTS

| | | | |
|---|---|---|---|
| 2011/0112820 A1 | 5/2011 | Bohizic et al. | |
| 2011/0113223 A1 | 5/2011 | Cavanna et al. | |
| 2011/0153307 A1* | 6/2011 | Winkel | G06F 9/455 703/26 |
| 2011/0231593 A1* | 9/2011 | Yasufuku | G06F 12/1027 711/3 |
| 2011/0320756 A1 | 12/2011 | Craddock et al. | |
| 2011/0321061 A1 | 12/2011 | Craddock et al. | |
| 2012/0089982 A1 | 4/2012 | Wang et al. | |
| 2012/0198122 A1 | 8/2012 | Abdallah | |
| 2012/0198157 A1 | 8/2012 | Abdallah | |
| 2012/0198168 A1 | 8/2012 | Abdallah | |
| 2012/0198209 A1 | 8/2012 | Abdallah et al. | |
| 2012/0297109 A1 | 11/2012 | Guthrie et al. | |
| 2013/0024619 A1 | 1/2013 | Abdallah | |
| 2013/0024661 A1 | 1/2013 | Abdallah | |
| 2013/0138931 A1 | 5/2013 | Gunna et al. | |
| 2013/0246766 A1 | 9/2013 | Gschwind et al. | |
| 2013/0339672 A1 | 12/2013 | Jacobi et al. | |
| 2014/0025893 A1 | 1/2014 | Brown | |
| 2014/0258696 A1 | 9/2014 | Srikantaiah | |
| 2014/0281388 A1 | 9/2014 | Abdallah | |
| 2014/0281410 A1 | 9/2014 | Abdallah | |
| 2016/0026488 A1 | 1/2016 | Bond et al. | |
| 2017/0003967 A1 | 1/2017 | Lin et al. | |

FOREIGN PATENT DOCUMENTS

| | | |
|---|---|---|
| EP | 1555617 A2 | 7/2005 |
| TW | I287801 B | 10/2007 |
| TW | 201250583 A | 12/2012 |
| WO | 9737301 A1 | 10/1997 |

OTHER PUBLICATIONS

Irvine, K.R., "Assembly Language for Intel-based Computers," 5th edition, 2007, p. 7.
Non-Final Office Action from U.S. Appl. No. 13/359,817, dated Aug. 27, 2014, 16 pages.
Non-Final Office Action from U.S. Appl. No. 13/359,832, dated Oct. 22, 2013, 15 pages.
Non-Final Office Action from U.S. Appl. No. 13/359,832, dated Sep. 23, 2014, 27 pages.
Notice of Allowance from U.S. Appl. No. 13/359,832, dated Feb. 19, 2015, 8 pages.
Notice of Allowance from U.S. Appl. No. 13/359,832, dated Jan. 7, 2016, 12 pages.
Notice of Allowance from U.S. Appl. No. 13/359,832, Jan. 13, 2017, 12 pages.
Notice of Allowance from U.S. Appl. No. 13/359,832, dated Jun. 8, 2015, 12 pages.
Notice of Allowance from U.S. Appl. No. 13/359,832, dated May 17, 2016, 14 pages.
Notice of Allowance from U.S. Appl. No. 13/359,832, dated Sep. 14, 2016, 12 pages.
Notice of Allowance from U.S. Appl. No. 13/359,832, dated Sep. 18, 2015, 12 pages.
Non-Final Office Action from U.S. Appl. No. 15/009,684, dated Aug. 24, 2016, 10 pages.
Non-final Office Action from U.S. Appl. No. 15/176,079, dated Jul. 13, 2017, 39 pages.
Non-Final Office Action from U.S. Appl. No. 15/354,679, dated Mar. 21, 2017, 19 pages.
Notice of Allowance from U.S. Appl. No. 13/359,767, dated Apr. 11, 2016, 12 pages.
Notice of Allowance from U.S. Appl. No. 13/359,767, dated Aug. 8, 2016, 12 pages.
Notice of Allowance from U.S. Appl. No. 13/359,767, dated Dec. 16, 2015, 8 pages.
Notice of Allowance from U.S. Appl. No. 13/359,767, dated Mar. 14, 2017, 14 pages.
Notice of Allowance from U.S. Appl. No. 13/359,767, dated Nov. 15, 2016, 12 pages.
Notice of Allowance from U.S. Appl. No. 13/359,817, dated Feb. 19, 2015, 8 pages.
Notice of Allowance from U.S. Appl. No. 13/359,817, dated Feb. 26, 2016, 9 pages.
Notice of Allowance from U.S. Appl. No. 13/359,817, dated Jan. 20, 2015, 13 pages.
Notice of Allowance from U.S. Appl. No. 13/359,817, dated May 1, 2015, 3 pages.
Notice of Allowance from U.S. Appl. No. 13/359,817, dated Sep. 9, 2016, 14 pages.
Notice of Allowance from U.S. Appl. No. 13/359,817, dated Sep. 11, 2015, 9 pages.
Notice of Allowance from U.S. Appl. No. 13/359,939, dated Aug. 25, 2014, 15 pages.
Notice of Allowance from U.S. Appl. No. 13/359,939, dated Dec. 3, 2014, 12 pages.
Notice of Allowance from U.S. Appl. No. 13/359,939, dated Dec. 9, 2016, 12 pages.
Notice of Allowance from U.S. Appl. No. 13/359,939, dated Dec. 28, 2015, 12 pages.
Notice of Allowance from U.S. Appl. No. 13/359,939, dated Mar. 30, 2015, 12 pages.
Notice of Allowance from U.S. Appl. No. 13/359,939, dated May 6, 2016, 12 pages.
Notice of Allowance from U.S. Appl. No. 13/359,939, dated May 12, 2014, 13 pages.
Notice of Allowance from U.S. Appl. No. 13/359,939, dated Sep. 1, 2015, 12 pages.
Notice of Allowance from U.S. Appl. No. 13/359,939, dated Sep. 2, 2016, 12 pages.
Notice of Allowance from U.S. Appl. No. 13/359,961, dated Jul. 11, 2014, 13 pages.
Notice of Allowance from U.S. Appl. No. 13/359,961, dated Jul. 15, 2015, 12 pages.
Notice of Allowance from U.S. Appl. No. 13/359,961, dated Mar. 26, 2015, 12 pages.
Notice of Allowance from U.S. Appl. No. 13/359,961, dated Oct. 28, 2014, 14 pages.
Notice of Allowance from U.S. Appl. No. 13/360,024, dated Jan. 10, 2017, 9 pages.
Notice of Allowance from U.S. Appl. No. 13/360,024, dated Jan. 20, 2015, 6 pages.
Notice of Allowance from U.S. Appl. No. 13/360,024, dated Jul. 5, 2016, 10 pages.
Notice of Allowance from U.S. Appl. No. 13/360,024, dated Mar. 1, 2016, 11 pages.
Notice of Allowance from U.S. Appl. No. 13/360,024, dated Mar. 23, 2017, 9 pages.
Notice of Allowance from U.S. Appl. No. 13/360,024, dated May 1, 2015, 10 pages.
Notice of Allowance from U.S. Appl. No. 13/360,024, dated Oct. 28, 2015, 10 pages.
Notice of Allowance from U.S. Appl. No. 15/009,684, dated Apr. 17, 2017, 20 pages.
Notice of Allowance from U.S. Appl. No. 15/009,684, dated Dec. 29, 2016, 9 pages.
Notice of Preliminary Rejection from foreign counterpart Korean Patent Application No. KR20157029321, dated Oct. 13, 2016, 8 pages.
Notification of Reason for Refusal from foreign counterpart Korean Patent Application No. 1020137022671, dated Sep. 15, 2015, 5 pages.
Office Action from foreign counterpart Chinese patent application No. 201280012962, dated Jan. 22, 2017, 8 pages.
Advisory Action from U.S. Appl. No. 14/211,655, dated Aug. 28, 2017, 3 pages.
Beck, L.L., "System Software," 3rd edition, Section 2.4 and Appendix A SIC/XE Instruction Set and Addressing Modes, 1997, pp. 50-54, 93, and 495-499.

(56) References Cited

OTHER PUBLICATIONS

Bhargava, et al., "Accelerating Two-Dimensional Page Walks for Virtualized Systems," ACM SIGOPS Operating Systems Review 42.2 (2008), pp. 26-35. Retrieved on [Mar. 19, 2015] Retrieved from the Internet: URL: http://dl.acm.org/citation.cfm?id=1346285.

Bungale, et al., "PinOS: a Programmable Framework for Whole-System Dynamic Instrumentation," Proceedings of the 3rd International Conference on Virtual Execution Environments, ACM, 2007, Retrieved on [Jul. 6, 2015] Retrieved from the Internet: URL: http://dl.acm.org/citation.cfm?id=1254830.

Chu P.P., "RTL Hardware Design Using VHDL," John Wiley & Sons, Apr. 2006, pp. 279-281.

Communication pursuant to Article 94(3) EPC for European Application No. 12739955.8, dated Apr. 14, 2015, 3 pages.

Communication pursuant to Article 94(3) EPC for European Application No. 12739955.8, dated Feb. 22, 2017, 3 pages.

Duesterwald E., "Design and Engineering of a Dynamic Binary Optimizer," Proceedings of the IEEE, vol. 93(2), 2005, pp. 436-448. Retrieved on [Jul. 9, 2014] from the Internet: URL: http://ieeexplore.ieee.org/stamp.jsp?tp=&arnumber=1386661.

Extended European Search Report for Application No. 14770972.9, dated Mar. 17, 2017, 8 pages.

Extended European Search Report for Application No. EP12739955, dated Aug. 4, 2014, 6 pages.

Final Office Action from U.S. Appl. No. 13/359,767, dated Feb. 26, 2015, 23 pages.

Final Office Action from U.S. Appl. No. 13/359,767, dated May 14, 2014, 32 pages.

Final Office Action from U.S. Appl. No. 14/211,476, dated Dec. 13, 2016, 23 pages.

Final Office Action from U.S. Appl. No. 14/211,655, dated Aug. 9, 2016, 29 pages.

Final Office Action from U.S. Appl. No. 14/211,655, dated Jun. 8, 2017, 41 pages.

Final Office Action from U.S. Appl. No. 15/354,679, dated Sep. 14, 2017, 39 pages.

First Office Action from foreign counterpart China Patent Application No. 201280012962.8, dated May 20, 2016, 15 pages.

Fisher-Ogden J., "Hardware Support for Efficient Virtualization," University of California, San Diego, Tech. Rep (2006), Retrieved on [Jul. 9, 2014] from the Internet: URL: http://dator8.info/2010/27.pdf.

Gligor, et al., "Using Binary Translation in Event Driven Simulation for Fast and Flexible MPSoC Simulation," Proceedings of the 7th IEEE/ACM International Conference on Hardware/Software co-design and system synthesis, ACM, 2009, Retrieved on [Jul. 6, 2015] Retrieved from the Internet: URL: http://dl.acm.org/citation.cfm?id=1629446.

Grant of Patent for Korean Application No. 10-2015-7029321, dated Apr. 28, 2017, 2 pages.

Grant of Patent from foreign counterpart Korean Patent Application No. 1020137022671, dated Mar. 2, 2016, 2 pages.

Guan H., et al., "CoDBT: A Multi-Source Dynamic Binary Translator using Hardware-Software Collaborative Techniques," Journal of Systems Architecture; Shanghai Jiao Tong University, Oct. 2010, vol. 56(10), pp. 500-508.

International Preliminary Report on Patentability for Application No. PCT/US2012/022538, dated Aug. 8, 2013, 8 pages.

International Preliminary Report on Patentability for Application No. PCT/US2012/022589, dated Aug. 8, 2013, 6 pages.

International Preliminary Report on Patentability for Application No. PCT/US2012/022598, dated Aug. 8, 2013, 6 pages.

International Preliminary Report on Patentability for Application No. PCT/US2012/022760, dated Aug. 8, 2013, 6 pages.

International Preliminary Report on Patentability for Application No. PCT/US2012/022773, dated Aug. 8, 2013, 7 pages.

International Preliminary Report on Patentability for Application No. PCT/US2012/022780, dated Aug. 8, 2013, 6 pages.

International Preliminary Report on Patentability for Application No. PCT/US2014/026176, dated Sep. 24, 2015, 6 pages.

International Preliminary Report on Patentability for Application No. PCT/US2014/026252, dated Sep. 24, 2015, 7 pages.

International Search Report and Written Opinion for Application No. PCT/US2012/022538, dated Jul. 30, 2012, 9 pages.

International Search Report and Written Opinion for Application No. PCT/US2012/022589, dated Aug. 29, 2012, 7 pages.

International Search Report and Written Opinion for Application No. PCT/US2012/022598, dated Aug. 28, 2012, 7 pages.

International Search Report and Written Opinion for Application No. PCT/US2012/022760, dated Jul. 16, 2012, 7 pages.

International Search Report and Written Opinion for Application No. PCT/US2012/022773, dated Sep. 20, 2012, 9 pages.

International Search Report and Written Opinion for Application No. PCT/US2012/022780, dated Jul. 31, 2012, 7 pages.

International Search Report and Written Opinion for Application No. PCT/US2014/026176, dated Jun. 27, 2014, 7 pages.

International Search Report and Written Opinion for Application No. PCT/US2014/026252, dated Jun. 27, 2014, 8 pages.

Mihocka, et al., "Virtualization without Direct Execution or Jitting: Designing a Portable Virtual Machine Infrastructure," 1st Workshop on Architectural and Micro-architectural Support for Binary Translation in ISCA-35, 2008. Retrieved on [Feb. 9, 2015] Retrieved from the Internet URL: http://index-of.es/Misc/VirtualizationWithoutHardwareFinal.pdf.

Non-Final Office Action from U.S. Appl. No. 13/359,767, dated Jul. 16, 2015, 28 pages.

Non-Final Office Action from U.S. Appl. No. 13/359,767, dated Oct. 23, 2013, 20 pages.

Non-Final Office Action from U.S. Appl. No. 13/359,767, dated Sep. 23, 2014, 29 pages.

Non-Final Office Action from U.S. Appl. No. 13/359,939, dated Nov. 5, 2013, 6 pages.

Non-Final Office Action from U.S. Appl. No. 13/359,961, dated Dec. 17, 2013, 10 pages.

Non-Final Office Action from U.S. Appl. No. 13/360,024, dated Sep. 29, 2014, 19 pages.

Non-Final Office Action from U.S. Appl. No. 14/211,476, dated Apr. 6, 2017, 38 pages.

Non-Final Office Action from U.S. Appl. No. 14/211,476, dated Aug. 9, 2016, 22 pages.

Non-Final Office Action from U.S. Appl. No. 14/211,476, dated Feb. 22, 2016, 23 pages.

Non-Final Office Action from U.S. Appl. No. 14/211,655, dated Dec. 29, 2016, 24 pages.

Non-Final Office Action from U.S. Appl. No. 14/211,655, dated Mar. 2, 2016, 19 pages.

Final Office Action from U.S. Appl. No. 14/211,476, dated Oct. 13, 2017, 32 pages.

First Office Action and Search report from foreign counterpart Chinese Patent Application No. 201480021703.0, dated Dec. 15, 2017, 30 pages. (translation available only for office action).

Non-final Office Action from U.S. Appl. No. 14/961,464, dated Nov. 20, 2017, 51 pages.

Non-Final Office Action from U.S. Appl. No. 15/042,005, dated Jan. 22, 2018, 10 pages.

Notice of Allowance from U.S. Appl. No. 15/176,079, dated Jan. 22, 2018, 6 pages.

Notice of Allowance from U.S. Appl. No. 15/176,079, dated Nov. 24, 2017, 27 pages.

Third Office Action from foreign counterpart China Patent Application No. 201280012962.8, dated Sep. 21, 2017, 8 pages.

Final Office Action from U.S. Appl. No. 14/961,464, dated Jun. 13, 2018, 27 pages.

Non-Final Office Action from U.S. Appl. No. 14/211,655, dated Apr. 18, 2018, 82 pages.

Notice of Allowance from U.S. Appl. No. 15/354,679, dated Mar. 28, 2018, 25 pages.

Notice on Grant of Patent Right for Invention from foreign counterpart Chinese Patent Application No. 201280012962.8, dated Apr. 9, 2018, 4 pages.

Abandonment from U.S. Appl. No. 15/042,005, dated Aug. 3, 2018, 2 pages.

(56) References Cited

OTHER PUBLICATIONS

Du, et al., "Performance Profiling of Virtual Machines," ACM SIGPLAN Notices, Jul. 2011, Retrieved from https://dl.acm.org/citation.cfm?id=1952686 on Sep. 8, 2018, vol. 46 (7), 13 pages.
Non Final Office Action from U.S. Appl. No. 14/211,476, dated Jul. 10, 2018, 70 pages.
Notice of Allowance from U.S. Appl. No. 14/961,464, dated Sep. 19, 2018, 8 pages.
Varanasi P., et al., "Hardware-Supported Virtualization on ARM," Proceedings of the Second Asia-Pacific Workshop on Systems, ACM, Jul. 2011. Retrieved from the Internet: http://ts.data61.csiro.au/publications/nicta_full_text/4938.pdf on Sep. 8, 2018, 5 pages.
Notice on Grant of Patent Right for Invention from foreign counterpart Chinese Patent Application No. 201480021703.0, dated Aug. 2, 2018, 4 pages.
Final Office Action from U.S. Appl. No. 14/211,476, dated Jan. 7, 2019, 51 pages.
Non-Final Office Action from U.S. Appl. No. 15/650,230, dated Nov. 14, 2018, 71 pages.
Notice of Allowance from U.S. Appl. No 14/211,655, dated Nov. 7, 2018, 17 pages.

\* cited by examiner

GUEST TO NATIVE BLOCK ADDRESS MAPPINGS AND MANAGEMENT OF NATIVE CODE STORAGE

CROSS-REFERENCE TO RELATED APPLICATIONS

The present application is a continuation of U.S. patent application Ser. No. 13/359,832, filed Jan. 27, 2012, entitled "GUEST TO NATIVE BLOCK ADDRESS MAPPINGS AND MANAGEMENT OF NATIVE CODE STORAGE," naming Mohammad Abdallah as inventor, which is herein incorporated by reference in its entirety, and which claims the benefit of co-pending commonly assigned U.S. Provisional Patent Application Ser. No. 61/436,957, titled "GUEST TO NATIVE BLOCK ADDRESS MAPPINGS AND MANAGEMENT OF NATIVE CODE STORAGE" by Mohammad A. Abdallah, filed on Jan. 27, 2011, and which is incorporated herein in its entirety.

FIELD OF THE INVENTION

The present invention is generally related to digital computer systems, more particularly, to a system and method for translating instructions comprising an instruction sequence.

BACKGROUND OF THE INVENTION

Many types of digital computer systems utilize code transformation/translation or emulation to implement software-based functionality. Generally, translation and emulation both involve examining a program of software instructions and performing the functions and actions dictated by the software instructions, even though the instructions are not "native" to the computer system. In the case of translation, the non-native instructions are translated into a form of native instructions which are designed to execute on the hardware of the computer system. Examples include prior art translation software and/or hardware that operates with industry standard x86 applications to enable the applications to execute on non-x86 or alternative computer architectures. Generally, a translation process utilizes a large number of processor cycles, and thus, imposes a substantial amount of overhead. The performance penalty imposed by the overhead can substantially erode any benefits provided by the translation process.

One attempt at solving this problem involves the use of just-in-time compilation. Just-in-time compilation (JIT), also known as dynamic translation, is a method to improve the runtime performance of computer programs. Traditionally, computer programs had two modes of runtime transformation, either interpretation mode or JIT (Just-In-Time) compilation/translation mode. Interpretation is a decoding process that involves decoding instruction by instruction to transform the code from guest to native with lower overhead than JIT compilation, but it produces a transformed code that is less performing. Additionally, the interpretation is invoked with every instruction. JIT compilers or translators represent a contrasting approach to interpretation. With JIT conversion, it usually has a higher overhead than interpreters, but it produces a translated code that is more optimized and one that has higher execution performance. In most emulation implementations, the first time a translation is needed, it is done as an interpretation to reduce overhead, after the code is seen (executed) many times, a JIT translation is invoked to create a more optimized translation.

However, the code transformation process still presents a number of problems. The JIT compilation process itself imposes a significant amount of overhead on the processor. This can cause a large delay in the start up of the application. Additionally, managing the storage of transformed code in system memory causes multiple trips back and forth to system memory and includes memory mapping and allocation management overhead, which imposes a significant latency penalty. Furthermore, changes to region of execution in the application involve relocating the transformed code in the system memory and code cache, and starting of the process from scratch. The interpretation process involves less overhead than JIT translation but it's overhead is repeated per instruction and thus is still relatively significant. The code produced is poorly optimized if at all.

SUMMARY OF THE INVENTION

Embodiments of the present invention implement an algorithm and an apparatus that enables hardware based acceleration of a guest instruction to native instruction conversion process.

In one embodiment, the present invention is implemented as a method for managing mappings of storage on a code cache for a processor. The method includes storing a plurality of guest address to native address mappings as entries in a conversion look aside buffer, wherein the entries indicate guest addresses that have corresponding converted native addresses stored within a code cache memory, and receiving a subsequent request for a guest address at the conversion look aside buffer. The conversion look aside buffer is indexed to determine whether there exists an entry that corresponds to the index, wherein the index comprises a tag and an offset that is used to identify the entry that corresponds to the index. Upon a hit on the tag, the corresponding entry is accessed to retrieve a pointer that indicates where in the code cache memory a corresponding block of converted native instructions reside. The corresponding block of converted native instructions are fetched from the code cache memory for execution.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Figure 1:
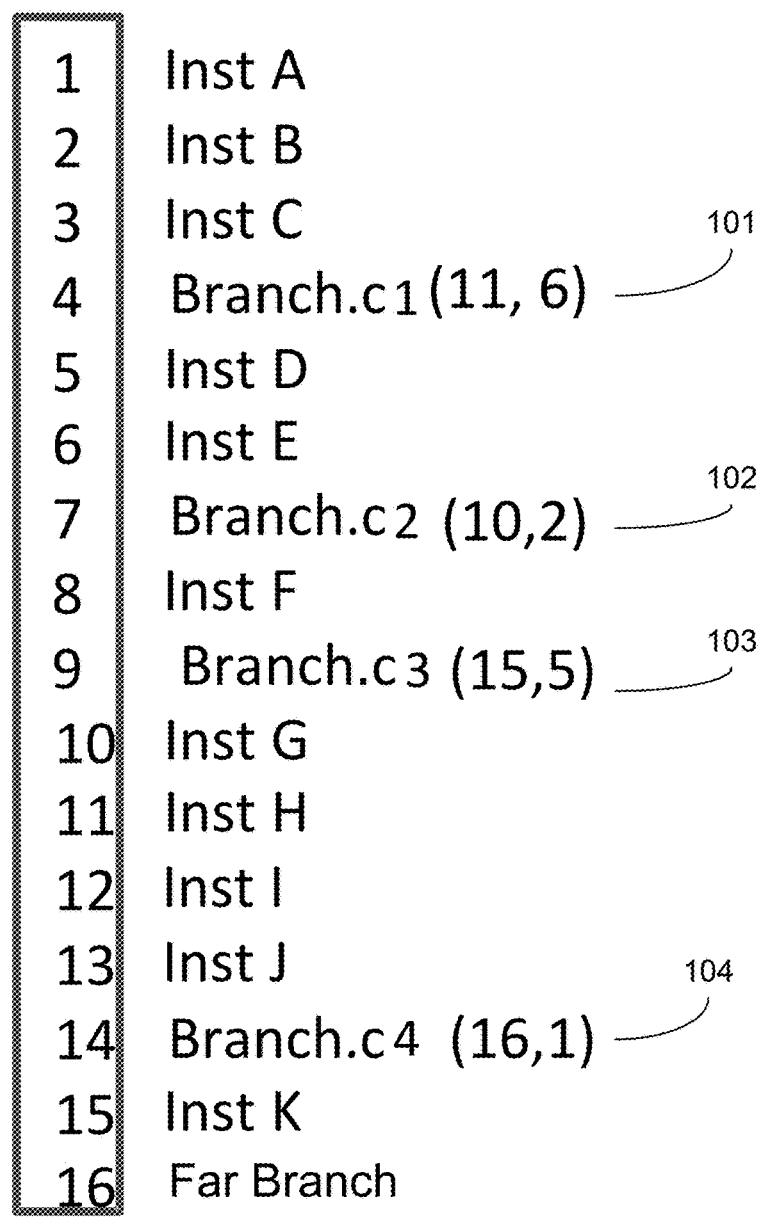
FIG. 1 shows an exemplary sequence of instructions operated on by one embodiment of the present invention.

Although the present invention has been described in connection with one embodiment, the invention is not intended to be limited to the specific forms set forth herein. On the contrary, it is intended to cover such alternatives, modifications, and equivalents as can be reasonably included within the scope of the invention as defined by the appended claims.

In the following detailed description, numerous specific details such as specific method orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

References within the specification to "one embodiment" or "an embodiment" are intended to indicate that a particular feature, structure, or characteristic described in connection with the embodiment is included in at least one embodiment of the present invention. The appearance of the phrase "in one embodiment" in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals of a computer readable storage medium and are capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "writing" or "storing" or "replicating" or the like, refer to the action and processes of a computer system, or similar electronic computing device that manipulates and transforms data represented as physical (electronic) quantities within the computer system's registers and memories and other computer readable media into other data similarly represented as physical quantities within the computer system memories or registers or other such information storage, transmission or display devices.

Embodiments of the present invention function by greatly accelerating the process of translating guest instructions from a guest instruction architecture into native instructions of a native instruction architecture for execution on a native processor. Embodiments of the present invention utilize hardware-based units to implement hardware acceleration for the conversion process. The guest instructions can be from a number of different instruction architectures. Example architectures include Java or JavaScript, x86, MIPS, SPARC, and the like. These guest instructions are rapidly converted into native instructions and pipelined to the native processor hardware for rapid execution. This provides a much higher level of performance in comparison to traditional software controlled conversion processes.

In one embodiment, the present invention implements a flexible conversion process that can use as inputs a number of different instruction architectures. In such an embodiment, the front end of the processor is implemented such that it can be software controlled, while taking advantage of hardware accelerated conversion processing to deliver the much higher level of performance. Such an implementation delivers benefits on multiple fronts. Different guest architectures can be processed and converted while each receives the benefits of the hardware acceleration to enjoy a much higher level of performance. The software controlled front end can provide a great degree of flexibility for applications executing on the processor. The hardware acceleration can achieve near native hardware speed for execution of the guest instructions of a guest application. In the descriptions which follow, FIG. 1 through FIG. 4 shows the manner in which embodiments of the present invention handle guest instruction sequences and handle near branches and far branches within those guest instruction sequences. FIG. 5 shows an overview of an exemplary hardware accelerated conversion processing system in accordance with one embodiment of the present invention.

FIG. 1 shows an exemplary sequence of instructions operated on by one embodiment of the present invention. As depicted in FIG. 1, the instruction sequence 100 comprises 16 instructions, proceeding from the top of FIG. 1 to the bottom. As can be seen in FIG. 1, the sequence 100 includes four branch instructions 101-104.

One objective of embodiments of the present invention is to process entire groups of instructions as a single atomic unit. This atomic unit is referred to as a block. A block of instructions can extend well past the 16 instructions shown in FIG. 1. In one embodiment, a block will include enough instructions to fill a fixed size (e.g., 64 bytes, 128 bytes, 256 bytes, or the like), or until an exit condition is encountered. In one embodiment, the exit condition for concluding a block of instructions is the encounter of a far branch instruction. As used herein in the descriptions of embodiments, a far branch refers to a branch instruction whose target address resides outside the current block of instructions. In other words, within a given guest instruction block, a far branch has a target that resides in some other block or in some other sequence of instructions outside the given instruction block. Similarly, a near branch refers to a branch instruction whose target address resides inside the current block of instructions. Additionally, it should be noted that a native instruction block can contain multiple guest far branches. These terms are further described in the discussions which follow below.

Figure 2:
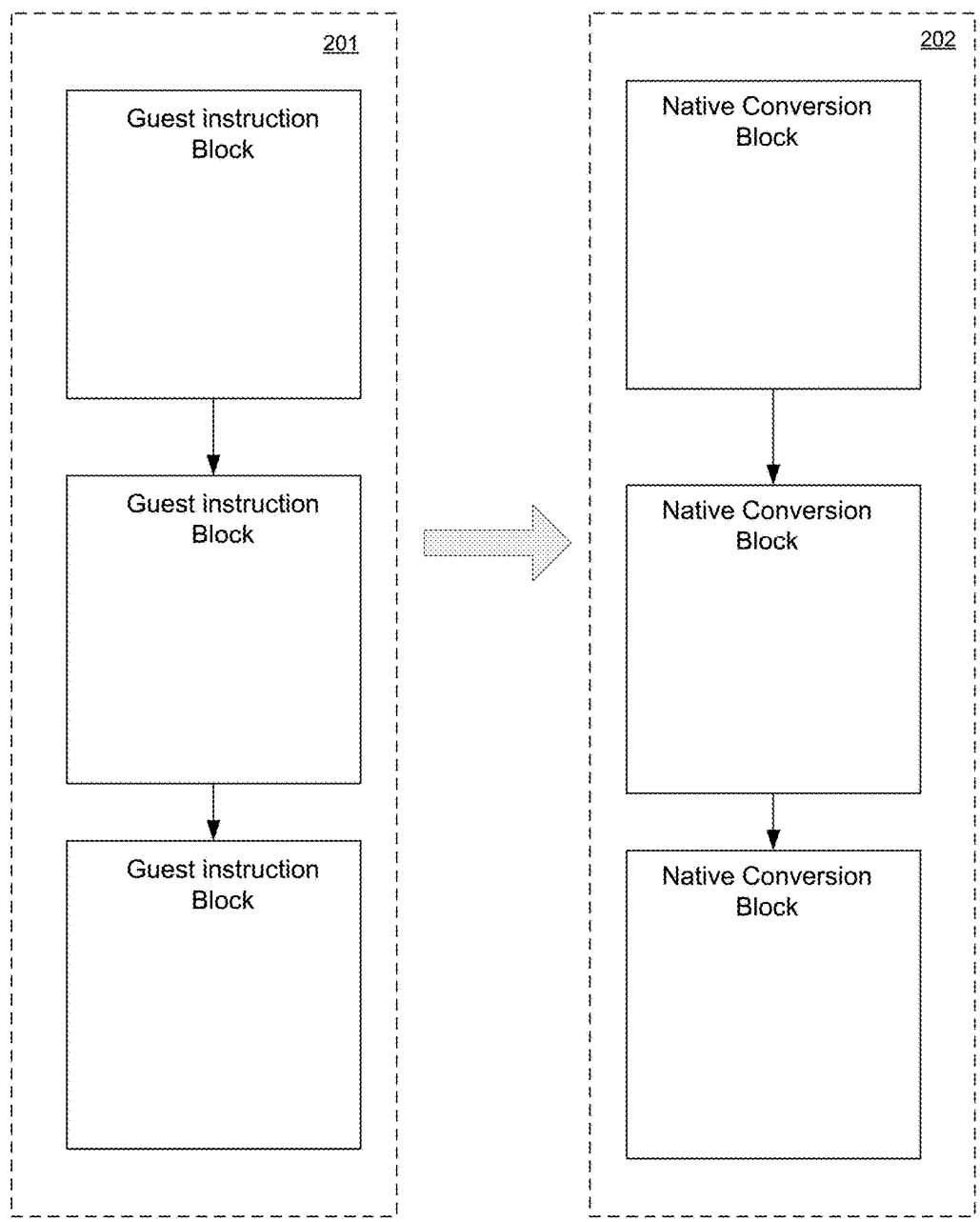
FIG. 2 shows a diagram depicting a block-based translation process where guest instruction blocks are converted to native conversion blocks in accordance with one embodiment of the present invention.

FIG. 2 shows a diagram depicting a block-based conversion process, where guest instruction blocks are converted to native conversion blocks in accordance with one embodiment of the present invention. As illustrated in FIG. 2, a plurality of guest instruction blocks 201 are shown being converted to a corresponding plurality of native conversion blocks 202.

Embodiments of the present invention function by converting instructions of a guest instruction block into corresponding instructions of a native conversion block. Each of the blocks 201 are made up of guest instructions. As described above, these guest instructions can be from a number of different guest instruction architectures (e.g., Java or JavaScript, x86, MIPS, SPARC, etc.). Multiple guest instruction blocks can be converted into one or more corresponding native conversion blocks. This conversion occurs on a per instruction basis.

FIG. 2 also illustrates the manner in which guest instruction blocks are assembled into sequences based upon a branch prediction. This attribute enables embodiments of the present invention to assemble sequences of guest instructions based upon the predicted outcomes of far branches. Based upon far branch prediction, a sequence of guest instructions is assembled from multiple guest instruction blocks and converted to a corresponding native conversion block. This aspect is further described in FIG. 3 and FIG. 4 below.

Figure 3:
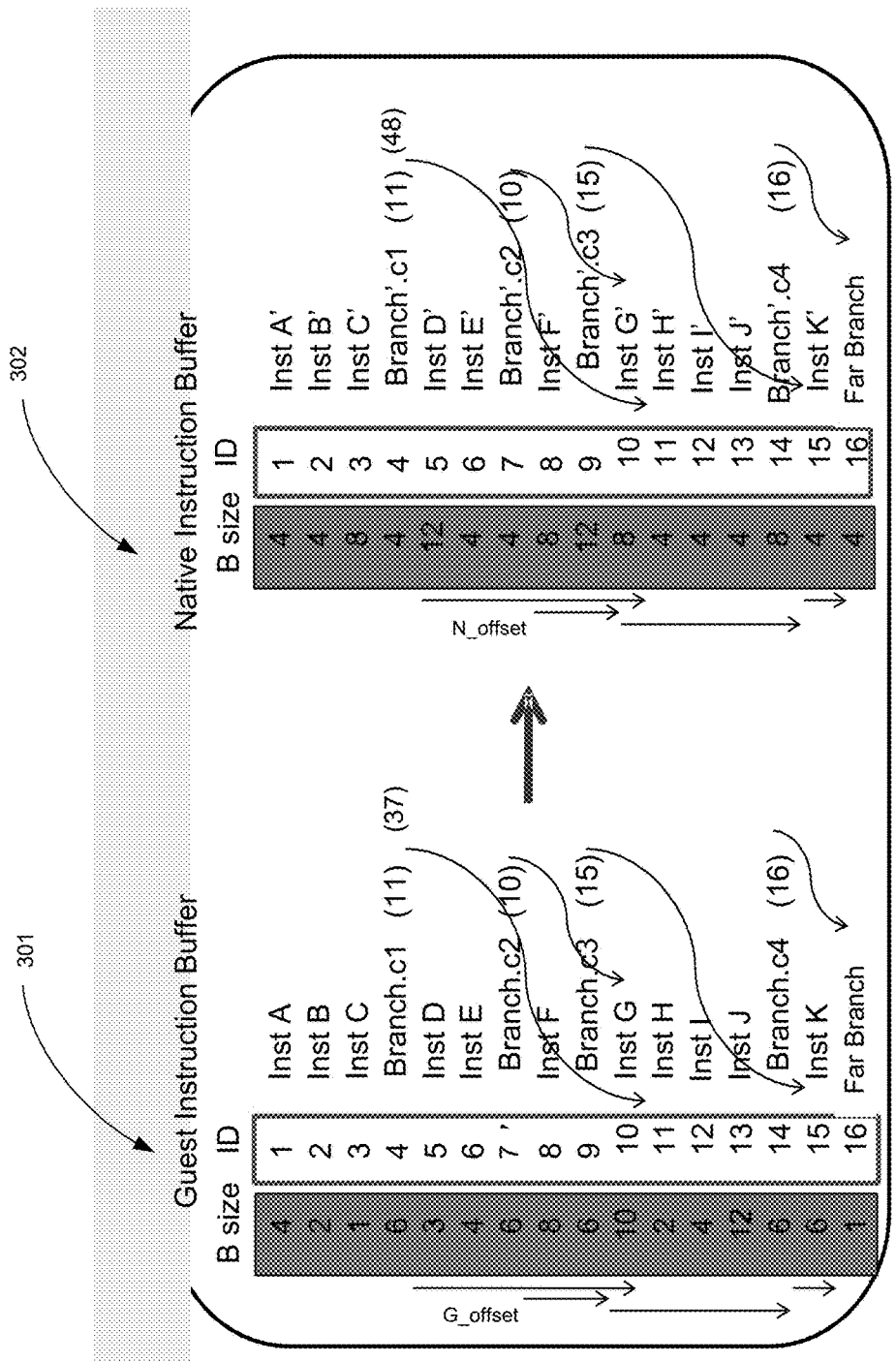
FIG. 3 shows a diagram illustrating the manner in which each instruction of a guest instruction block is converted to a corresponding native instruction of a native conversion block in accordance with one embodiment of the present invention.

FIG. 3 shows a diagram illustrating the manner in which each instruction of a guest instruction block is converted to a corresponding native instruction of a native conversion block in accordance with one embodiment of the present invention. As illustrated in FIG. 3, the guest instruction blocks reside within a guest instruction buffer 301. Similarly, the native conversion block(s) reside within a native instruction buffer 302.

FIG. 3 shows an attribute of embodiments of the present invention, where the target addresses of the guest branch instructions are converted to target addresses of the native branch instructions. For example, the guest instruction branches each include an offset that identifies the target address of the particular branch. This is shown in FIG. 3 as the guests offset, or G_offset. As guest instructions are converted, this offset is often different because of the different lengths or sequences required by the native instructions to produce the functionality of the corresponding guest instructions. For example, the guest instructions may be of different lengths in comparison to their corresponding native instructions. Hence, the conversion process compensates for this difference by computing the corresponding native offset. This is shown in FIG. 3 as the native offset, or N_offset.

It should be noted that the branches that have targets within a guest instruction block, referred to as near branches, are not predicted, and therefore do not alter the flow of the instruction sequence.

Figure 4:
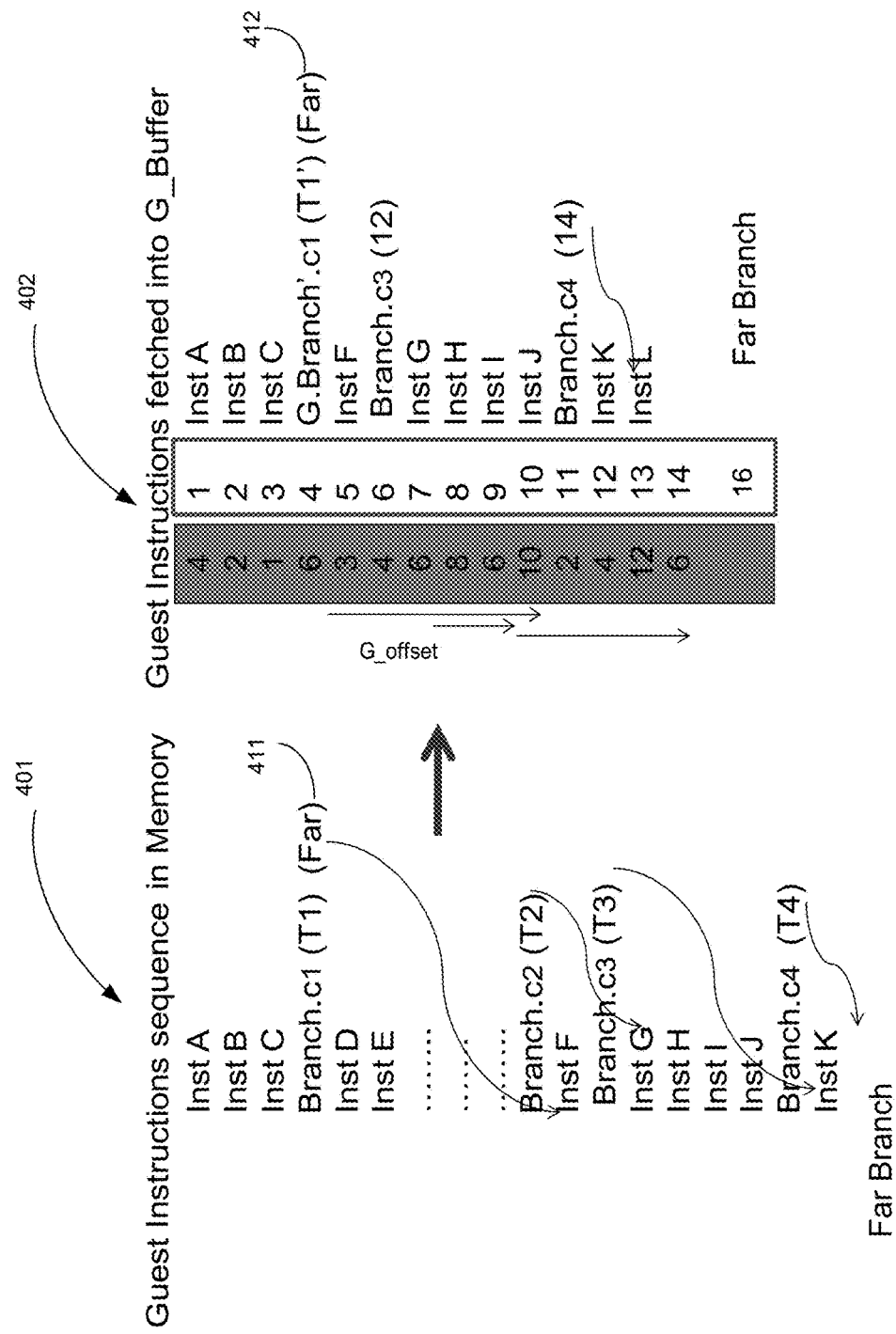
FIG. 4 shows a diagram illustrating the manner in which far branches are processed with handling of native conversion blocks in accordance with one embodiment of the present invention.
Figure 5:
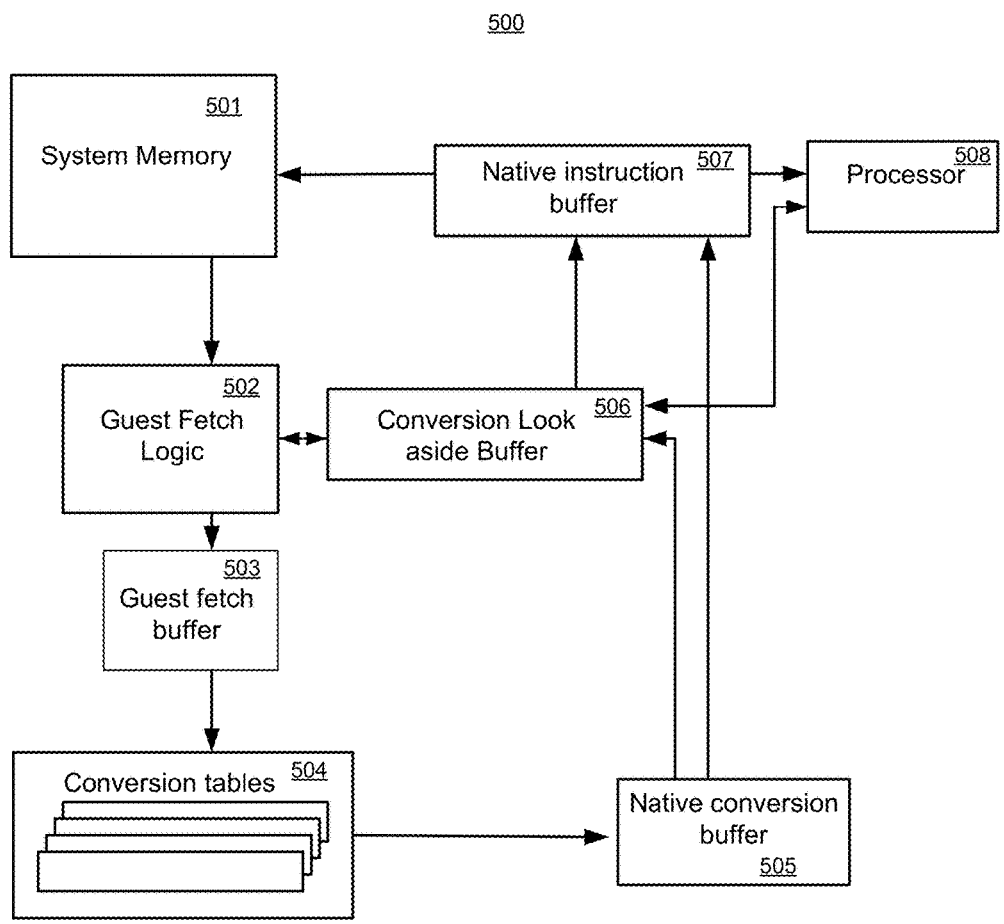
FIG. 5 shows a diagram of an exemplary hardware accelerated conversion system illustrating the manner in which guest instruction blocks and their corresponding native conversion blocks are stored within a cache in accordance with one embodiment of the present invention.

FIG. 4 shows a diagram illustrating the manner in which far branches are processed with handling of native conversion blocks in accordance with one embodiment of the present invention. As illustrated in FIG. 4, the guest instructions are depicted as a guest instruction sequence in memory 401. Similarly, the native instructions are depicted as a native instruction sequence in memory 402.

In one embodiment, every instruction block, both guest instruction blocks and native instruction blocks, concludes with a far branch (e.g., even though native blocks can contain multiple guest far branches). As described above, a block will include enough instructions to fill a fixed size (e.g., 64 bytes, 128 bytes, 256 bytes, or the like) or until an exit condition, such as, for example, the last guest far branch instruction, is encountered. If a number of guest instructions have been processed to assemble a guest instruction block and a far branch has not been encountered, then a guest far branch is inserted to conclude the block. This far branch is merely a jump to the next subsequent block. This ensures that instruction blocks conclude with a branch that leads to either another native instruction block, or another sequence of guest instructions in memory. Additionally, as shown in FIG. 4 a block can include a guest far branch within its sequence of instructions that does not reside at the end of the block. This is shown by the guest instruction far branch 411 and the corresponding native instruction guest far branch 412.

In the FIG. 4 embodiment, the far branch 411 is predicted taken. Thus the instruction sequence jumps to the target of the far branch 411, which is the guest instruction F. Similarly, in the corresponding native instructions, a far branch 412 is followed by the native instruction F. The near branches are not predicted. Thus, they do not alter the instruction sequence in the same manner as far branches.

In this manner, embodiments of the present invention generate a trace of conversion blocks, where each block comprises a number (e.g., 3-4) of far branches. This trace is based on guest far branch predictions.

In one embodiment, the far branches within the native conversion block include a guest address that is the opposite address for the opposing branch path. As described above, a sequence of instructions is generated based upon the prediction of far branches. The true outcome of the prediction will not be known until the corresponding native conversion block is executed. Thus, once a false prediction is detected, the false far branch is examined to obtain the opposite guest address for the opposing branch path. The conversion process then continues from the opposite guest address, which is now the true branch path. In this manner, embodiments of the present invention use the included opposite guest address for the opposing branch path to recover from occasions where the predicted outcome of a far branch is false. Hence, if a far branch predicted outcome is false, the process knows where to go to find the correct guest instruction. Similarly, if the far branch predicted outcome is true, the opposite guest address is ignored. It should be noted that if far branches within native instruction block are predicted correctly, no entry point in CLB for their target blocks is needed. However, once a miss prediction occurs, a new entry for the target block needs to be inserted in CLB. This function is performed with the goal of preserving CLB capacity.

FIG. 5 shows a diagram of an exemplary hardware accelerated conversion system 500 illustrating the manner in which guest instruction blocks and their corresponding native conversion blocks are stored within a cache in accordance with one embodiment of the present invention. As illustrated in FIG. 5, a conversion look aside buffer 506 is used to cache the address mappings between guest and native blocks; such that the most frequently encountered native conversion blocks are accessed through low latency availability to the processor 508.

The FIG. 5 diagram illustrates the manner in which frequently encountered native conversion blocks are maintained within a high-speed low latency cache, the conversion look aside buffer 506. The components depicted in FIG. 5 implement hardware accelerated conversion processing to deliver the much higher level of performance.

The guest fetch logic unit 502 functions as a hardware-based guest instruction fetch unit that fetches guest instructions from the system memory 501. Guest instructions of a given application reside within system memory 501. Upon initiation of a program, the hardware-based guest fetch logic unit 502 starts prefetching guess instructions into a guest fetch buffer 503. The guest fetch buffer 507 accumulates the guest instructions and assembles them into guest instruction blocks. These guest instruction blocks are converted to corresponding native conversion blocks by using the conversion tables 504. The converted native instructions are accumulated within the native conversion buffer 505 until the native conversion block is complete. The native conversion block is then transferred to the native cache 507 and the mappings are stored in the conversion look aside buffer 506. The native cache 507 is then used to feed native instructions to the processor 508 for execution. In one embodiment, the functionality implemented by the guest fetch logic unit 502 is produced by a guest fetch logic state machine.

As this process continues, the conversion look aside buffer 506 is filled with address mappings of guest blocks to native blocks. The conversion look aside buffer 506 uses one or more algorithms (e.g., least recently used, etc.) to ensure that block mappings that are encountered more frequently are kept within the buffer, while block mappings that are rarely encountered are evicted from the buffer. In this manner, hot native conversion blocks mappings are stored within the conversion look aside buffer 506. In addition, it should be noted that the well predicted far guest branches within the native block do not need to insert new mappings in the CLB because their target blocks are stitched within a single mapped native block, thus preserving a small capacity efficiency for the CLB structure. Furthermore, in one embodiment, the CLB is structured to store only the ending guest to native address mappings. This aspect also preserves the small capacity efficiency of the CLB.

The guest fetch logic 502 looks to the conversion look aside buffer 506 to determine whether addresses from a guest instruction block have already been converted to a native conversion block. As described above, embodiments of the present invention provide hardware acceleration for conversion processing. Hence, the guest fetch logic 502 will look to the conversion look aside buffer 506 for pre-existing native conversion block mappings prior to fetching a guest address from system memory 501 for a new conversion.

In one embodiment, the conversion look aside buffer is indexed by guest address ranges, or by individual guest address. The guest address ranges are the ranges of addresses of guest instruction blocks that have been converted to native conversion blocks. The native conversion block mappings stored by a conversion look aside buffer are indexed via their corresponding guest address range of the corresponding guest instruction block. Hence, the guest fetch logic can compare a guest address with the guest address ranges or the individual guest address of converted blocks, the mappings of which are kept in the conversion look aside buffer 506 to determine whether a pre-existing native conversion block resides within what is stored in the native cache 507 or in the code cache of FIG. 6. If the pre-existing native conversion block is in either of the native cache or in the code cache, the corresponding native conversion instructions are forwarded from those caches directly to the processor.

In this manner, hot guest instruction blocks (e.g., guest instruction blocks that are frequently executed) have their corresponding hot native conversion blocks mappings maintained within the high-speed low latency conversion look aside buffer 506. As blocks are touched, an appropriate replacement policy ensures that the hot blocks mappings remain within the conversion look aside buffer. Hence, the guest fetch logic 502 can quickly identify whether requested guest addresses have been previously converted, and can forward the previously converted native instructions directly to the native cache 507 for execution by the processor 508. These aspects save a large number of cycles, since trips to system memory can take 40 to 50 cycles or more. These attributes (e.g., CLB, guest branch sequence prediction, guest & native branch buffers, native caching of the prior) allow the hardware acceleration functionality of embodiments of the present invention to achieve application performance of a guest application to within 80% to 100% the application performance of a comparable native application.

In one embodiment, the guest fetch logic 502 continually prefetches guest instructions for conversion independent of guest instruction requests from the processor 508. Native conversion blocks can be accumulated within a conversion buffer "code cache" in the system memory 501 for those less frequently used blocks. The conversion look aside buffer 506 also keeps the most frequently used mappings. Thus, if a requested guest address does not map to a guest address in the conversion look aside buffer, the guest fetch logic can check system memory 501 to determine if the guest address corresponds to a native conversion block stored therein.

In one embodiment, the conversion look aside buffer 506 is implemented as a cache and utilizes cache coherency protocols to maintain coherency with a much larger conversion buffer stored in higher levels of cache and system memory 501. The native instructions mappings that are stored within the conversion look aside buffer 506 are also written back to higher levels of cache and system memory 501. Write backs to system memory maintain coherency. Hence, cache management protocols can be used to ensure the hot native conversion blocks mappings are stored within the conversion look aside buffer 506 and the cold native conversion mappings blocks are stored in the system memory 501. Hence, a much larger form of the conversion buffer 506 resides in system memory 501.

It should be noted that in one embodiment, the exemplary hardware accelerated conversion system 500 can be used to implement a number of different virtual storage schemes. For example, the manner in which guest instruction blocks and their corresponding native conversion blocks are stored within a cache can be used to support a virtual storage scheme. Similarly, a conversion look aside buffer 506 that is used to cache the address mappings between guest and native blocks can be used to support the virtual storage scheme (e.g., management of virtual to physical memory mappings).

In one embodiment, the FIG. 5 architecture implements virtual instruction set processor/computer that uses a flexible conversion process that can receive as inputs a number of different instruction architectures. In such a virtual instruction set processor, the front end of the processor is implemented such that it can be software controlled, while taking advantage of hardware accelerated conversion processing to deliver the much higher level of performance. Using such an implementation, different guest architectures can be processed and converted while each receives the benefits of the hardware acceleration to enjoy a much higher level of performance. Example guest architectures include Java or JavaScript, x86, MIPS, SPARC, and the like. In one embodiment, the "guest architecture" can be native instructions (e.g., from a native application/macro-operation) and the conversion process produces optimize native instructions (e.g., optimized native instructions/micro-operations). The software controlled front end can provide a large degree of flexibility for applications executing on the processor. As described above, the hardware acceleration can achieve near native hardware speed for execution of the guest instructions of a guest application.

Figure 6:
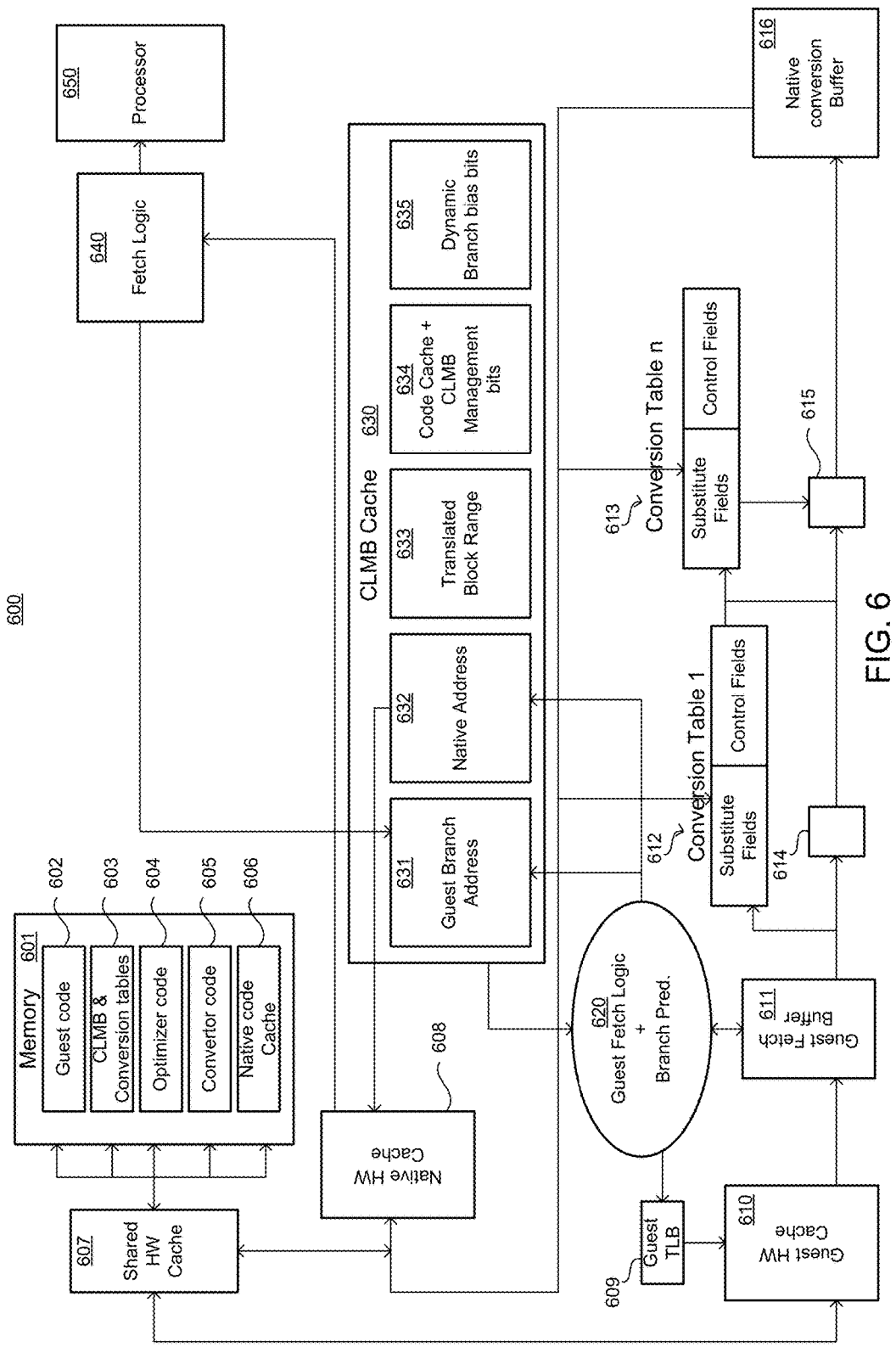
FIG. 6 shows a more detailed example of a hardware accelerated conversion system in accordance with one embodiment of the present invention.

FIG. 6 shows a more detailed example of a hardware accelerated conversion system 600 in accordance with one embodiment of the present invention. System 600 performers in substantially the same manner as system 500 described above. However, system 600 shows additional details describing functionality of an exemplary hardware acceleration process.

The system memory 601 includes the data structures comprising the guest code 602, the conversion look aside buffer 603, optimizer code 604, converter code 605, and native code cache 606. System 600 also shows a shared hardware cache 607 where guest instructions and native instructions can both be interleaved and shared. The guest hardware cache 610 catches those guest instructions that are most frequently touched from the shared hardware cache 607.

The guest fetch logic 620 prefetches guest instructions from the guest code 602. The guest fetch logic 620 interfaces with a TLB 609 which functions as a conversion look aside buffer that translates virtual guest addresses into corresponding physical guest addresses. The TLB 609 can forward hits directly to the guest hardware cache 610. Guest instructions that are fetched by the guest fetch logic 620 are stored in the guest fetch buffer 611.

The conversion tables 612 and 613 include substitute fields and control fields and function as multilevel conversion tables for translating guest instructions received from the guest fetch buffer 611 into native instructions.

The multiplexers 614 and 615 transfer the converted native instructions to a native conversion buffer 616. The native conversion buffer 616 accumulates the converted native instructions to assemble native conversion blocks. These native conversion blocks are then transferred to the native hardware cache 600 and the mappings are kept in the conversion look aside buffer 630.

The conversion look aside buffer 630 includes the data structures for the converted blocks entry point address 631, the native address 632, the converted address range 633, the code cache and conversion look aside buffer management bits 634, and the dynamic branch bias bits 635. The guest branch address 631 and the native address 632 comprise a guest address range that indicates which corresponding native conversion blocks reside within the converted lock range 633. Cache management protocols and replacement policies ensure the hot native conversion blocks mappings reside within the conversion look aside buffer 630 while the cold native conversion blocks mappings reside within the conversion look aside buffer data structure 603 in system memory 601.

As with system 500, system 600 seeks to ensure the hot blocks mappings reside within the high-speed low latency conversion look aside buffer 630. Thus, when the fetch logic 640 or the guest fetch logic 620 looks to fetch a guest address, in one embodiment, the fetch logic 640 can first check the guest address to determine whether the corresponding native conversion block resides within the code cache 606. This allows a determination as to whether the requested guest address has a corresponding native conversion block in the code cache 606. If the requested guest address does not reside within either the buffer 603 or 608, or the buffer 630, the guest address and a number of subsequent guest instructions are fetched from the guest code 602 and the conversion process is implemented via the conversion tables 612 and 613.

Figure 7:
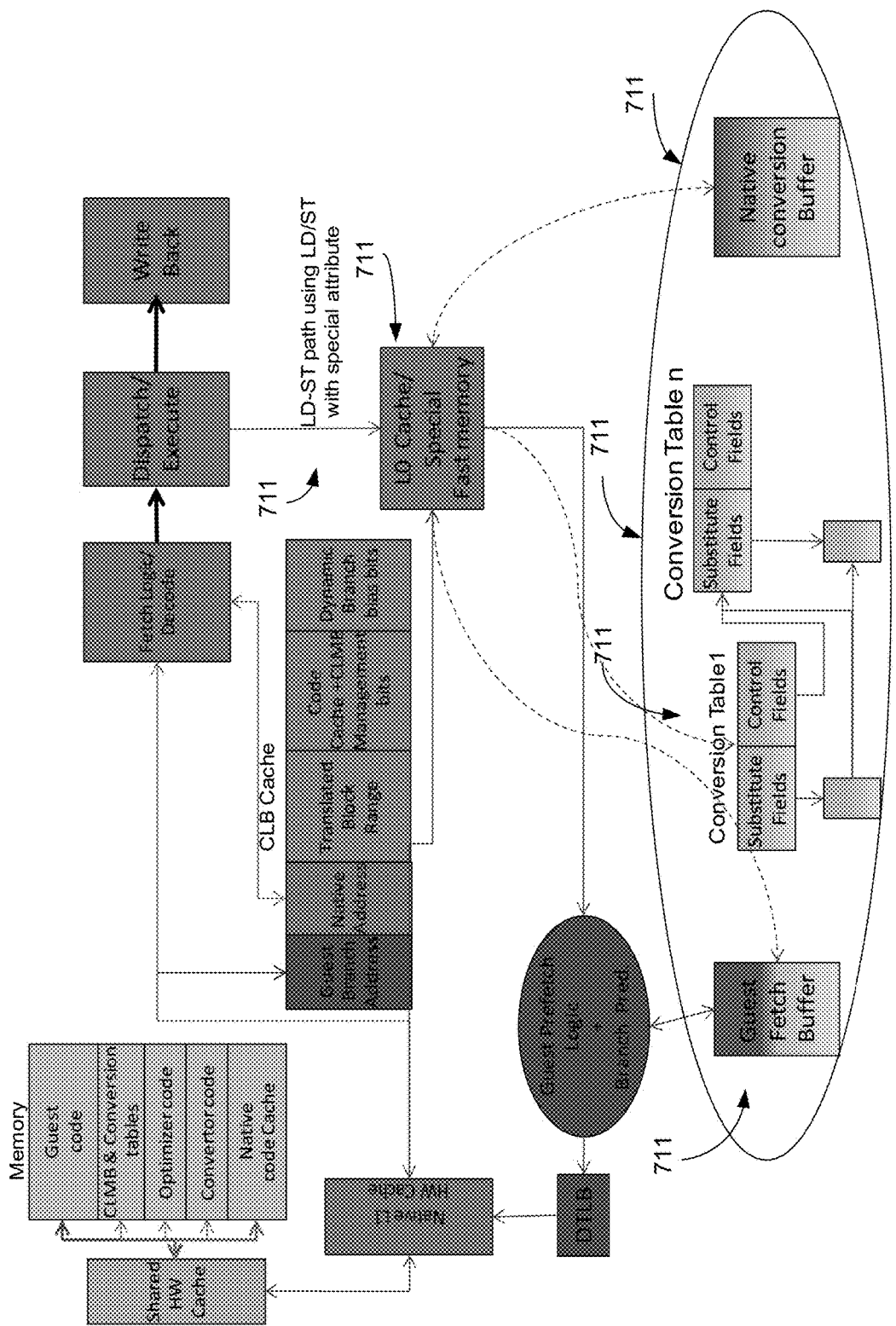
FIG. 7 shows an example of a hardware accelerated conversion system having a secondary software-based accelerated conversion pipeline in accordance with one embodiment of the present invention.

FIG. 7 shows an example of a hardware accelerated conversion system 700 having a secondary software-based accelerated conversion pipeline in accordance with one embodiment of the present invention.

The components 711-716 comprise a software implemented load store path that is instantiated within a specialized high speed memory 760. As depicted in FIG. 7, the guest fetch buffer 711, conversion tables 712-713 and native conversion buffer 716 comprise allocated portions of the specialized high speed memory 760. In many respects, the specialized high-speed memory 760 functions as a very low-level fast cache (e.g., L0 cache).

The arrow 761 illustrates the attribute whereby the conversions are accelerated via a load store path as opposed to an instruction fetch path (e.g., from the fetched decode logic).

In the FIG. 7 embodiment, the high-speed memory 760 includes special logic for doing comparisons. Because of this, the conversion acceleration can be implemented in software. For example, in another embodiment, the standard memory 760 that stores the components 711-716 is manipulated by software which uses a processor execution pipeline, where it loads values from said components 711-716 into one or more SIMD register(s) and implements a compare instruction that performs a compare between the fields in the SIMD register and, as needed, perform a mask operation and a result scan operation. A load store path can be implemented using general purpose microprocessor hardware, such as, for example, using compare instructions that compare one to many.

It should be noted that the memory 760 is accessed by instructions that have special attributes or address ranges. For example, in one embodiment, the guest fetch buffer has an ID for each guest instruction entry. The ID is created per guest instruction. This ID allows easy mapping from the guest buffer to the native conversion buffer. The ID allows an easy calculation of the guest offset to the native offset, irrespective of the different lengths of the guest instructions in comparison to the corresponding native instructions. This aspect is diagramed in FIG. 3 above.

In one embodiment the ID is calculated by hardware using a length decoder that calculates the length of the fetched guest instruction. However, it should be noted that this functionality can be performed in hardware or software.

Once IDs have been assigned, the native instructions buffer can be accessed via the ID. The ID allows the conversion of the offset from guest offset to the native offset.

Figure 8:
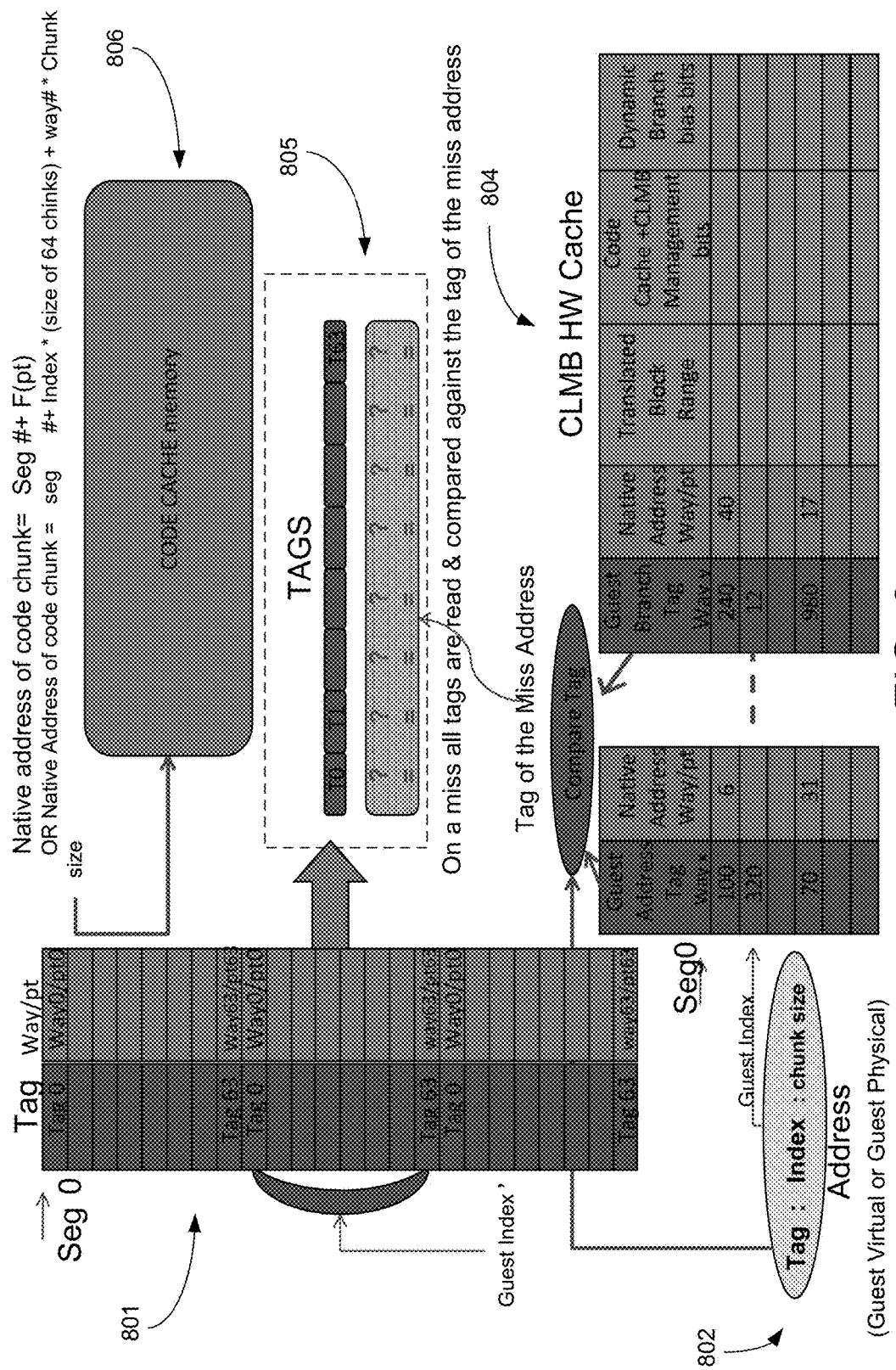
FIG. 8 shows an exemplary flow diagram illustrating the manner in which the CLB functions in conjunction with the code cache and the guest instruction to native instruction mappings stored within memory in accordance with one embodiment of the present invention.

FIG. 8 shows an exemplary flow diagram illustrating the manner in which the CLB functions in conjunction with the code cache and the guest instruction to native instruction mappings stored within memory in accordance with one embodiment of the present invention.

As described above, the CLB is used to store mappings of guest addresses that have corresponding converted native addresses stored within the code cache memory (e.g., the guest to native address mappings). In one embodiment, the CLB is indexed with a portion of the guest address. The guest address is partitioned into an index, a tag, and an offset (e.g., chunk size). This guest address comprises a tag that is used to identify a match in the CLB entry that corresponds to the index. If there is a hit on the tag, the corresponding entry will store a pointer that indicates where in the code cache memory 806 the corresponding converted native instruction chunk (e.g., the corresponding block of converted native instructions) can be found.

It should be noted that the term "chunk" as used herein refers to a corresponding memory size of the converted native instruction block. For example, chunks can be different in size depending on the different sizes of the converted native instruction blocks.

With respect to the code cache memory 806, in one embodiment, the code cache is allocated in a set of fixed size chunks (e.g., with different size for each chunk type). The code cache can be partitioned logically into sets and ways in system memory and all lower level HW caches (e.g., native hardware cache 608, shared hardware cache 607). The CLB can use the guest address to index and tag compare the way tags for the code cache chunks.

FIG. 8 depicts the CLB hardware cache 804 storing guest address tags in 2 ways, depicted as way x and way y. It should be noted that, in one embodiment, the mapping of guest addresses to native addresses using the CLB structures can be done through storing the pointers to the native code chunks (e.g., from the guest to native address mappings) in the structured ways. Each way is associated with a tag. The CLB is indexed with the guest address 802 (comprising a tag). On a hit in the CLB, the pointer corresponding to the tag is returned. This pointer is used to index the code cache memory. This is shown in FIG. 8 by the line "native address of code chunk=Seg#+F(pt)" which represents the fact that the native address of the code chunk is a function of the pointer and the segment number. In the present embodiment, the segment refers to a base for a point in memory where the pointer scope is virtually mapped (e.g., allowing the pointer array to be mapped into any region in the physical memory).

Alternatively, in one embodiment, the code cache memory can be indexed via a second method, as shown in FIG. 8 by the line "Native Address of code chunk=seg#+Index*(size of chunk)+way#*(Chunk size)". In such an embodiment, the code cache is organized such that its way-structures match the CLB way structuring so that a 1:1 mapping exist between the ways of CLB and the ways of the code cache chunks. When there is a hit in a particular CLB way then the corresponding code chunk in the corresponding way of the code cache has the native code.

Referring still to FIG. 8, if the index of the CLB misses, the higher hierarchies of memory can be checked for a hit (e.g., L1 cache, L2 cache, and the like). If there is no hit in these higher cache levels, the addresses in the system memory 801 are checked. In one embodiment, the guest index points to a entry comprising, for example, 64 chunks. The tags of each one of the 64 chunks are read out and compared against the guest tag to determine whether there is a hit. This process is shown in FIG. 8 by the dotted box 805. If there is no hit after the comparison with the tags in system memory, there is no conversion present at any hierarchical level of memory, and the guest instruction must be converted.

It should be noted that embodiments of the present invention manage each of the hierarchical levels of memory that store the guest to native instruction mappings in a cache like manner. This comes inherently from cache-based memory (e.g., the CLB hardware cache, the native cache, L1 and L2 caches, and the like). However, the CLB also includes "code cache+CLB management bits" that are used to implement a least recently used (LRU) replacement management policy for the guest to native instruction mappings within system memory 801. In one embodiment, the CLB management bits (e.g., the LRU bits) are software managed. In this manner, all hierarchical levels of memory are used to store the most recently used, most frequently encountered guest to native instruction mappings. Correspondingly, this leads to all hierarchical levels of memory similarly storing the most frequently encountered converted native instructions.

FIG. 8 also shows dynamic branch bias bits and/or branch history bits stored in the CLB. These dynamic branch bits are used to track the behavior of branch predictions used in assembling guest instruction sequences. These bits are used to track which branch predictions are most often correctly predicted and which branch predictions are most often predicted incorrectly. The CLB also stores data for converted block ranges. This data enables the process to invalidate the converted block range in the code cache memory where the corresponding guest instructions have been modified (e.g., as in self modifying code).

Figure 9:
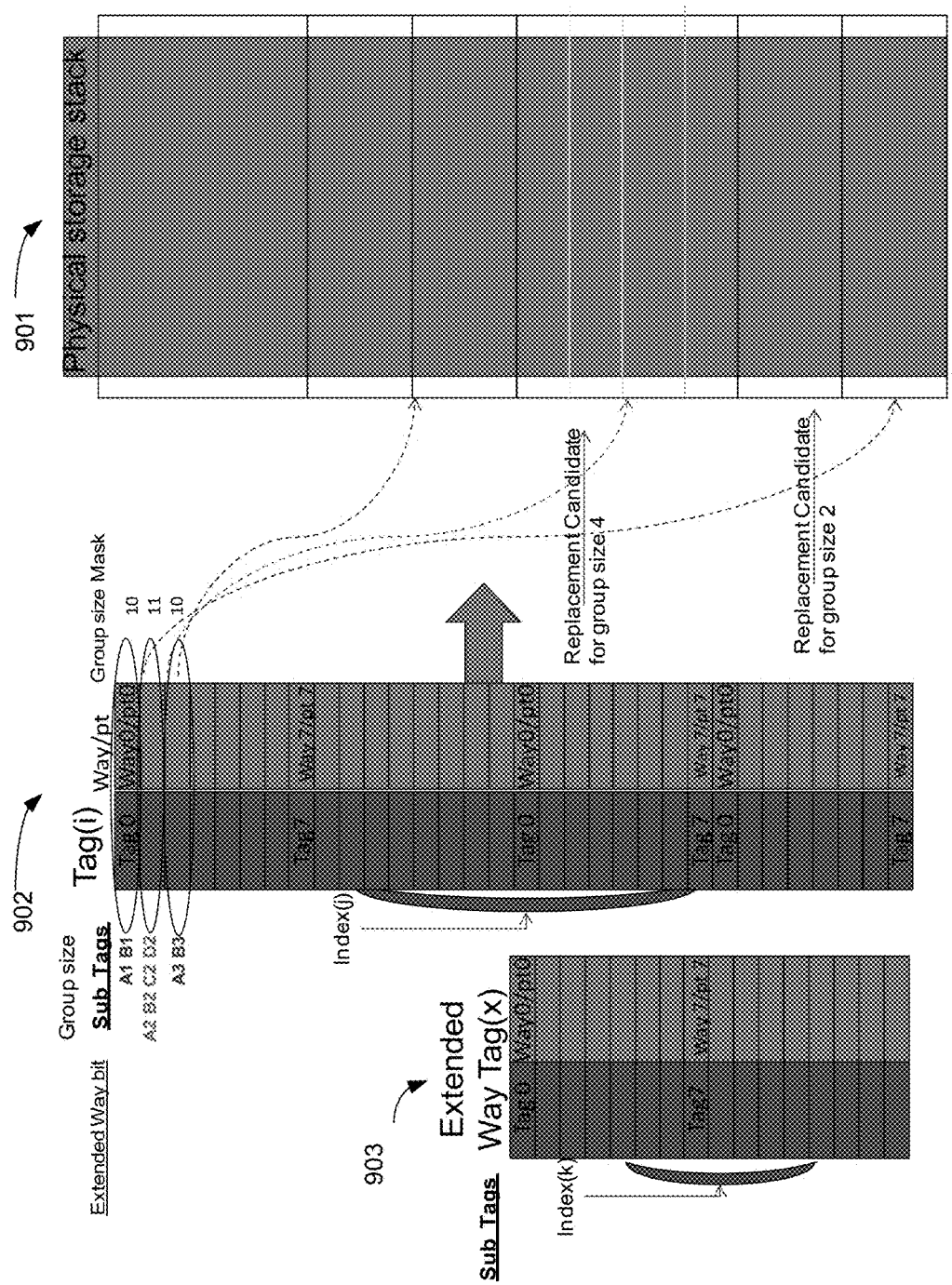
FIG. 9 shows an exemplary flow diagram illustrating a physical storage stack code cache implementation and the guest instruction to native instruction mappings in accordance with one embodiment of the present invention.

FIG. 9 shows an exemplary flow diagram illustrating a physical storage stack cache implementation and the guest address to native address mappings in accordance with one embodiment of the present invention. As depicted in FIG. 9, the cache can be implemented as a physical storage stack 901.

FIG. 9 embodiment illustrates the manner in which a code cache can be implemented as a variable structure cache. Depending upon the requirements of different embodiments, the variable structure cache can be completely hardware implemented and controlled, completely software implemented and controlled, or some mixture of software intimidation and control and underlying hardware enablement.

The FIG. 9 embodiment is directed towards striking an optimal balance for the task of managing the allocation and replacement of the guest to native address mappings and their corresponding translations in the actual physical storage. In the present embodiment, this is accomplished through the use of a structure that combines the pointers with variable size chunks.

A multi-way tag array is used to store pointers for different size groups of physical storage. Each time a particular storage size needs to be allocated (e.g., where the storage size corresponds to an address), then accordingly, a group of storage blocks each corresponding to that size is allocated. This allows an embodiment of the present invention to precisely allocate storage to store variable size traces of instructions. FIG. 9 shows how groups can be of different sizes. Two exemplary group sizes are shown, "replacement candidate for group size 4" and "replacement candidate for group size 2". A pointer is stored in the TAG array (in addition to the tag that correspond to the address) that maps the address into the physical storage address. The tags can comprise two or more sub-tags. For example, the top 3 tags in the tag structure 902 comprise sub tags A1 B1, A2 B2 C2 D2, and A3 B3 respectively as shown. Hence, tag A2 B2 C2 D2 comprises a group size 4, while tag A1 B1 comprises a group size 2. The group size mask also indicates the size of the group.

The physical storage can then be managed like a stack, such that every time there is a new group allocated, it can be placed on top of the physical storage stack. Entries are invalidated by overwriting their tag, thereby recovering the allocated space.

FIG. 9 also shows an extended way tag structure 903. In some circumstances, an entry in the tag structure 902 will have a corresponding entry in the extended way tag structure 903. This depends on upon whether the entry and the tag structure has an extended way bit set (e.g., set to one). For example, the extended way bit set to one indicates that there are corresponding entries in the extended way tag structure. The extended way tag structure allows the processor to extend locality of reference in a different way from the standard tag structure. Thus, although the tag structure 902 is indexed in one manner (e.g., index (j)), the extended way tag structure is indexed in a different manner (e.g., index (k)).

In a typical implementation, the index(J) can be much larger number of entries within the index(k). This is because, in most limitations, the primary tag structure 902 is much larger than the extended way tag structure 903, where, for example, (j) can cover 1024 entries (e.g., 10 bits) while (k) can cover 256 (e.g., 8 bits).

This enables embodiments of the present invention to incorporate additional ways for matching traces that have become very hot (e.g., very frequently encountered). For example, if a match within a hot set is not found in the tag structure 902, then by setting an extended way bit, the extended way tag structure can be used to store additional ways for the hot trace. It should be noted that this variable cache structure uses storage only as needed for the cached code/data that we store on the stack, for example, if any of the cache sets (the entries indicated by the index bits) is never accessed during a particular phase of a program, then there will be no storage allocation for that set on the stack. This provides an efficient effective storage capacity increase compared to typical caches where sets have fixed physical data storage for each and every set.

There can be also bits to indicate that a set or group of sets are cold (e.g., meaning they have not been accesses in a long time). In this case the stack storage for those sets looks like bubbles within the allocated stack storage. At that time, their allocation pointers can be claimed for other hot sets. This process is a storage reclamation process, where after a chunk has been allocated within the stack, the whole set to which that chunk belongs become later cold. The needed mechanisms and structures (not shown in FIG. 9 in order not to clutter or obscure the aspects shown) that can facilitate this reclamation are: a cold set indicator for every set (entry index) and a reclamation process where the pointers for the ways of those cold sets are reused for other hot set's ways. This allows those stack storage bubbles (chunks) to be reclaimed. When not in reclamation mode, a new chunk is allocated on top of the stack, when the stack has cold sets (e.g., the set ways/chunks are not accessed in a long time) a reclamation action allow a new chunk that needs to be allocated in another set to reuse the reclaimed pointer and its associated chunk storage (that belongs to a cold set) within the stack.

It should be noted that the FIG. 9 embodiment is well-suited to use standard memory in its implementation as opposed to specialized cache memory. This attribute is due to the fact that the physical storage stack is managed by reading the pointers, reading indexes, and allocating address ranges. Specialized cache-based circuit structures are not needed in such an implementation.

It should be noted that in one embodiment, the FIG. 9 architecture can be used to implement data caches and caching schemes that do not involve conversion or code transformation. Consequently, the FIG. 9 architecture can be used to implement more standardized caches (e.g., L2 data cache, etc.). Doing so would provide a larger effective capacity in comparison to a conventional fixed structure cache, or the like.

Figure 10:
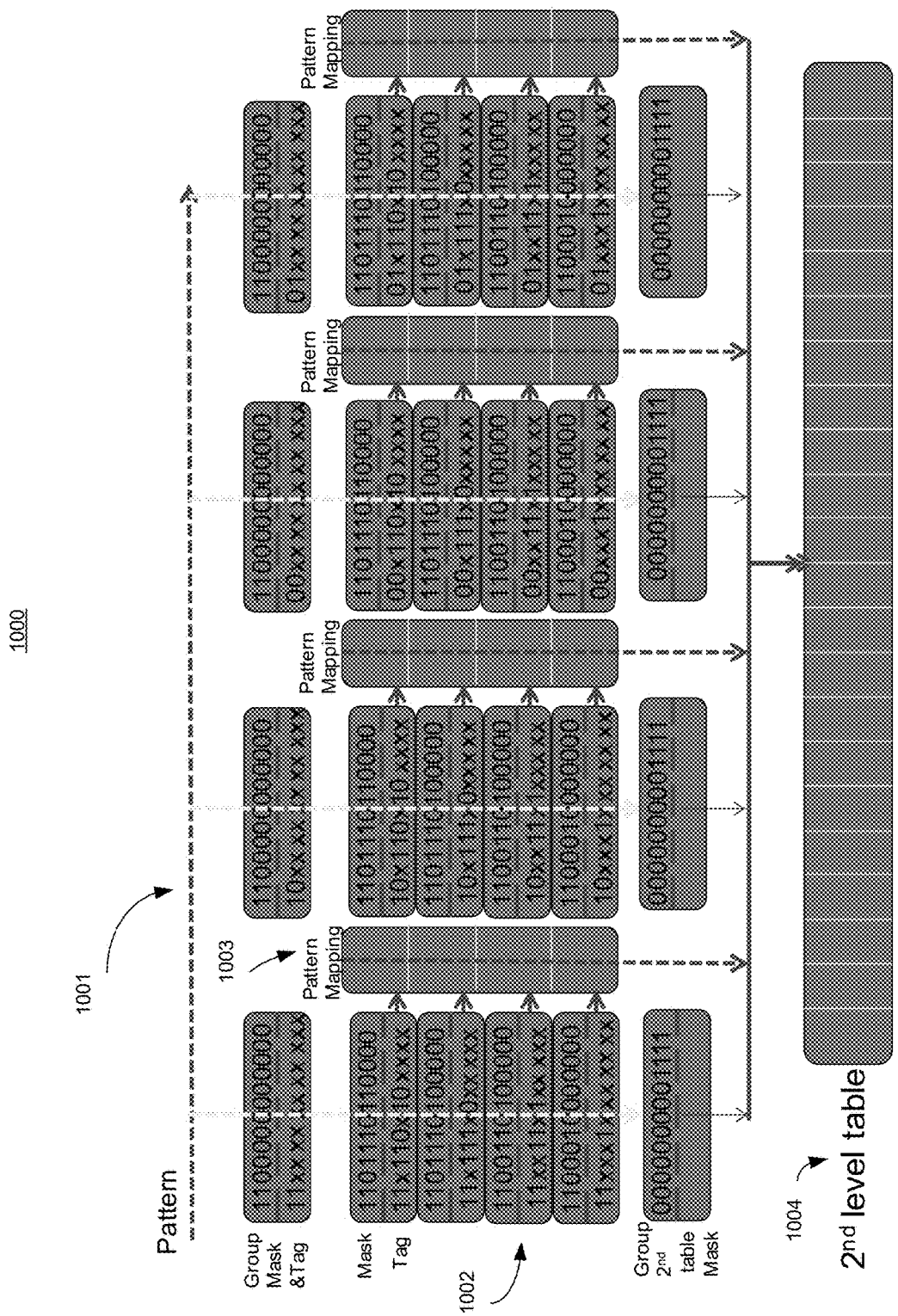
FIG. 10 shows a diagram depicting additional exemplary details of a hardware accelerated conversion system in accordance with one embodiment of the present invention.

FIG. 10 shows a diagram depicting additional exemplary details of a hardware accelerated conversion system 1000 in accordance with one embodiment of the present invention. The line 1001 illustrates the manner in which incoming guests instructions are compared against a plurality of group masks and tags. The objective is to quickly identify the type of guest instruction and assign it to a corresponding group. The group masks and tags function by matching subfields of the guest instruction in order to identify particular groups to which the guest instruction belongs. The mask obscures irrelevant bits of the guest instruction pattern to look particularly at the relevant bits. The tables, such as for example, table 1002, stores the mask-tag pairs in a prioritized manner.

A pattern is matched by reading into the table in the priority direction, which is depicted in this case being from the top down. In this manner, a pattern is matched by reading in the priority direction of the mask-tag storage. The different masks examined in order of their priority and the pattern matching functionality is correspondingly applied in order of their priority. When a hit is found, then the corresponding mapping of the pattern is read from a corresponding table storing the mappings (e.g., table 1003). The 2nd level tables 1004 illustrates the hierarchical manner in which multiple conversion tables can be accessed in a cascading sequential manner until a full conversion of the guest instruction is achieved. As described above, the conversion tables include substitute fields and control fields and function as multilevel conversion tables for translating guest instructions received from the guest fetch buffer into native instructions.

In this manner, each byte stream in the buffer sent to conversion tables where each level of conversion table serially detects bit fields. As the relevant bit fields are detected, the table substitutes the native equivalence of the field.

The table also produces a control field that helps the substitution process for this level as well as the next level table (e.g., the 2nd level table 1004). The next table uses the previous table control filed to identify next relevant bit field, which is in substituted with the native equivalence. The second level table can then produce control field to help a first level table, and so on. Once all guest bit fields are substituted with native bit fields, the instruction is fully translated and is transmitted to the native conversion buffer. The native conversion buffer is then written into the code cache and its guest to native address mappings are logged in the CLB, as described above.

Figure 11A:
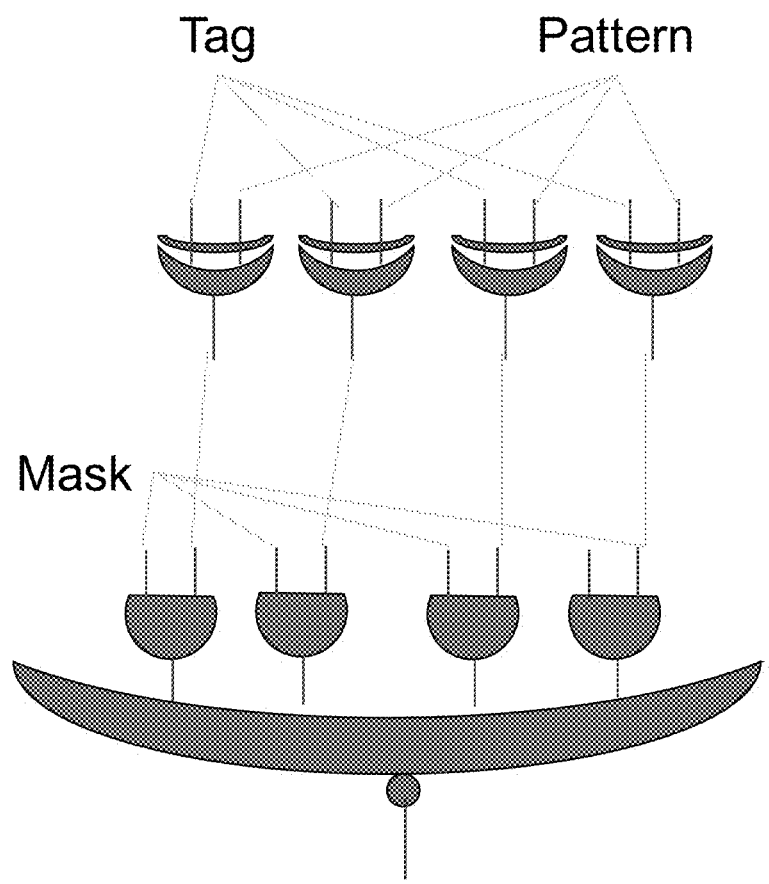
FIG. 11A shows a diagram of an exemplary pattern matching process implemented by embodiments of the present invention.

FIG. 11A shows a diagram of an exemplary pattern matching process implemented by embodiments of the present invention. As depicted in FIG. 11A, destination is determined by the tag, the pattern, and the mask. The functionality of the pattern decoding comprises performing a bit compare (e.g., bitwise XOR), performing a bit AND (e.g., bitwise AND), and subsequently checking all zero bits (e.g., NOR of all bits).

Figure 11B:
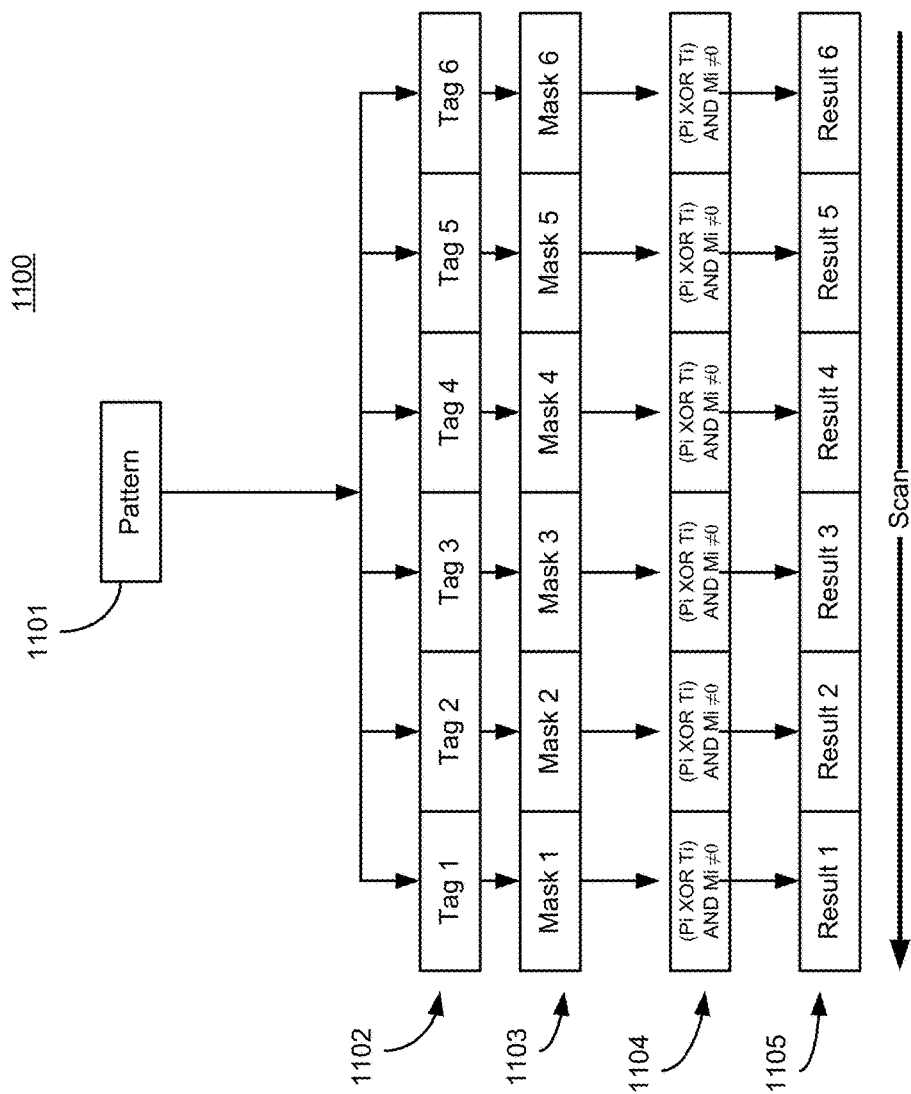
FIG. 11B shows a diagram of a SIMD register-based pattern matching process in accordance with one embodiment of the present invention.

FIG. 11B shows a diagram 1100 of a SIMD register based pattern matching process in accordance with one embodiment of the present invention. As depicted in diagram 1100, four SIMD registers 1102-1105 are shown. These registers implement the functionality of the pattern decoding process as shown. An incoming pattern 1101 is used to perform a parallel bit compare (e.g., bitwise XOR) on each of the tags, and the result performs a bit AND with the mask (e.g., bitwise AND). The match indicator results are each stored in their respective SIMD locations as shown. A scan is then performed as shown, and the first true among the SIMD elements encountered by the scan is the element where the equation (Pi XOR Ti) AND Mi=0 for all i bits is true, where Pi is the respective pattern, Ti is the respective tag and Mi is the respective mask.

Figure 12:
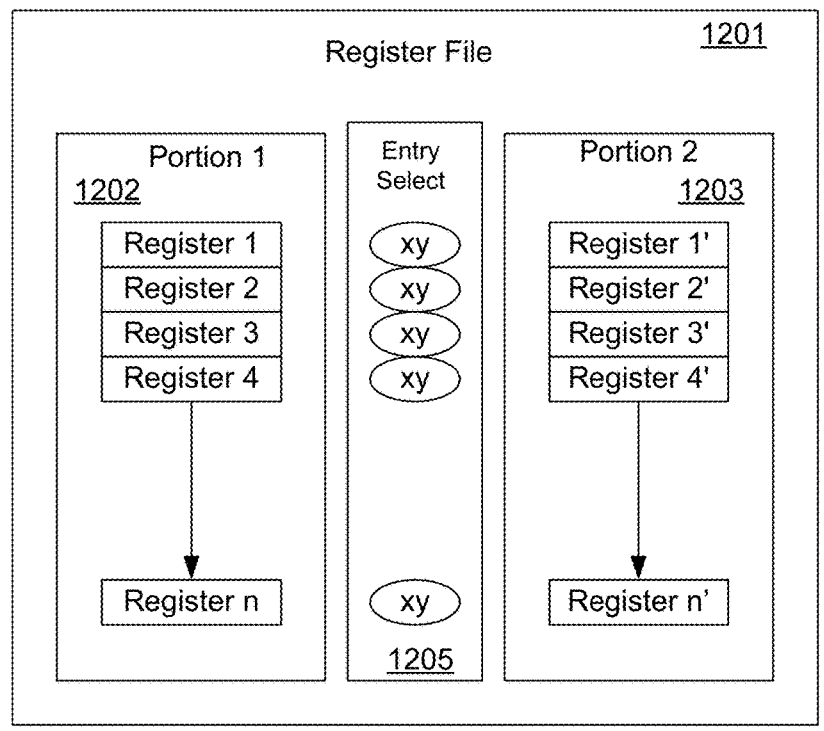
FIG. 12 shows a diagram of a unified register file in accordance with one embodiment of the present invention.

FIG. 12 shows a diagram of a unified register file 1201 in accordance with one embodiment of the present invention. As depicted in FIG. 12, the unified register file 1201 includes 2 portions 1202-1203 and an entry selector 1205. The unified register file 1201 implements support for architecture speculation for hardware state updates.

The unified register file 1201 enables the implementation of an optimized shadow register and committed register state management process. This process supports architecture speculation for hardware state updating. Under this process, embodiments of the present invention can support shadow register functionality and committed register functionality without requiring any cross copying between register memory. For example, in one embodiment, the functionality of the unified register file 1201 is largely provided by the entry selector 1205. In the FIG. 12 embodiment, each register file entry is composed from 2 pairs of registers, R & R', which are from portion 1 and the portion 2, respectively. At any given time, the register that is read from each entry is either R or R', from portion 1 or portion 2. There are 4 different combinations for each entry of the register file based on the values of x & y bits stored for each entry by the entry selector 105.

The values for the x & y bits are as follows.
00: R not Valid; R' committed (upon read request R' is read)
01: R speculative; R' committed (upon read request R is read)
10: R committed; R' speculative (upon read request R' is read)
11: R committed; R' not Valid (upon read request R is read)

The following are the impact of each instruction/event. Upon Instruction Write back, 00 becomes 01 and 11 becomes 10. Upon instruction commit, 01 becomes 11 and 10 becomes 00. Upon the occurrence of a rollback event, 01 becomes 00 and 10 becomes 11.

These changes are mainly changes to the state stored in the register file entry selector 1205 and happen based on the events as they occur. It should be noted that commit instructions and roll back events need to reach a commit stage in order to cause the bit transition in the entry selector 1205.

In this manner, execution is able to proceed within the shadow register state without destroying the committed register state. When the shadow register state is ready for committing, the register file entry selector is updated such that the valid results are read from which portion in the manner described above. In this manner, by simply updating the register file entry selector as needed, speculative execution results can be rolled back to most recent commit point in the event of an exception. Similarly, the commit point can be advanced forward, thereby committing the speculative execution results, by simply updating the register file entry selectors. This functionality is provided without requiring any cross copying between register memory.

In this manner, the unified register file can implement a plurality of speculative scratch shadow registers (SSSR) and a plurality of committed registers (CR) via the register file entry selector 1205. For example, on a commit, the SSSR registers become CR registers. On roll back SSSR state is rolled back to the CR registers.

Figure 13:
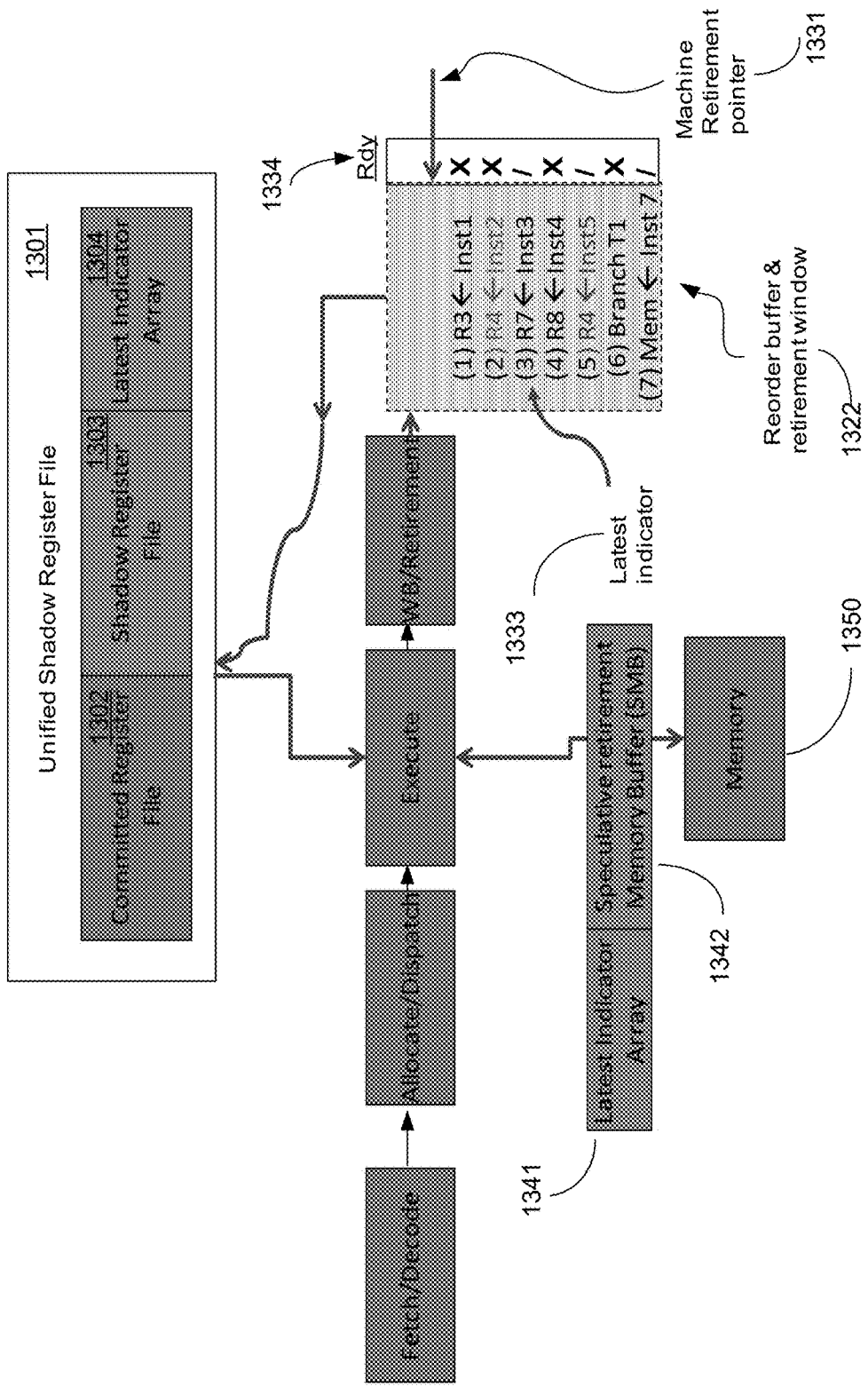
FIG. 13 shows a diagram of a unified shadow register file and pipeline architecture 1300 that supports speculative architectural states and transient architectural states in accordance with one embodiment of the present invention.

FIG. 13 shows a diagram of a unified shadow register file and pipeline architecture 1300 that supports speculative architectural states and transient architectural states in accordance with one embodiment of the present invention.

The FIG. 13 embodiment depicts the components comprising the architecture 1300 that supports instructions and results comprising architecture speculation states and supports instructions and results comprising transient states. As used herein, a committed architecture state comprises visible registers and visible memory that can be accessed (e.g., read and write) by programs executing on the processor. In contrast, a speculative architecture state comprises registers and/or memory that is not committed and therefore is not globally visible.

In one embodiment, there are four usage models that are enabled by the architecture 1300. A first usage model includes architecture speculation for hardware state updates, as described above in the discussion of FIG. 12.

A second usage model includes dual scope usage. This usage model applies to the fetching of 2 threads into the processor, where one thread executes in a speculative state and the other thread executes in the non-speculative state. In this usage model, both scopes are fetched into the machine and are present in the machine at the same time.

A third usage model includes the JIT (just-in-time) translation or compilation of instructions from one form to another. In this usage model, the reordering of architectural states is accomplished via software, for example, the JIT. The third usage model can apply to, for example, guest to native instruction translation, virtual machine to native instruction translation, or remapping/translating native micro instructions into more optimized native micro instructions.

A fourth usage model includes transient context switching without the need to save and restore a prior context upon returning from the transient context. This usage model applies to context switches that may occur for a number of reasons. One such reason could be, for example, the precise handling of exceptions via an exception handling context. The second, third, and fourth usage models are further described in the discussions of FIGS. 14-17 below.

Referring again to FIG. 13, the architecture 1300 includes a number of components for implementing the 4 usage models described above. The unified shadow register file 1301 includes a first portion, committed register file 1302, a second portion, the shadow register file 1303, and a third portion, the latest indicator array 1304. A speculative retirement memory buffer 1342 and a latest indicator array 1340 are included. The architecture 1300 comprises an out of order architecture, hence, the architecture 1300 further includes a reorder buffer and retirement window 1332. The reorder and retirement window 1332 further includes a machine retirement pointer 1331, a ready bit array 1334 and a per instruction latest indicator, such as indicator 1333.

The first usage model, architecture speculation for hardware state updates, is further described in detail in accordance with one embodiment of the present invention. As described above, the architecture 1300 comprises a out of order architecture. The hardware of the architecture 1300 able to commit out of order instruction results (e.g., out of order loads and out of order stores and out of order register updates). The architecture 1300 utilizes the unified shadow register file in the manner described in discussion of FIG. 12 above to support speculative execution between committed registers and shadow registers. Additionally, the architecture 1300 utilizes the speculative load store buffer 1320 and the speculative retirement memory buffer 1342 to support speculative execution.

The architecture 1300 will use these components in conjunction with reorder buffer and retirement window 1332 to allow its state to retire correctly to the committed register file 1302 and to the visible memory 1350 even though the machine retired those in out of order manner internally to the unified shadow register file and the retirement memory buffer. For example, the architecture will use the unified shadow register file 1301 and the speculative memory 1342 to implement rollback and commit events based upon whether exceptions occur or do not occur. This functionality enables the register state to retire out of order to the unified shadow register file 1301 and enables the speculative retirement memory buffer 1342 to retire out of order to the visible memory 1350. As speculative execution proceeds and out of order instruction execution proceeds, if no branch has been missed predicted and there are no exceptions that occur, the machine retirement pointer 1331 advances until a commit event is triggered. The commit event causes the unified shadow register file to commit its contents by advancing its commit point and causes the speculative retirement memory buffer to commit its contents to the memory 1350 in accordance with the machine retirement pointer 1331.

For example, considering the instructions 1-7 that are shown within the reorder buffer and retirement window 1332, the ready bit array 1334 shows an "X" beside instructions are ready to execute and a "/" beside instructions that are not ready to execute. Accordingly, instructions 1, 2, 4, and 6 are allowed to proceed out of order. Subsequently, if an exception occurs, such as the instruction 6 branch being miss-predicted, the instructions that occur subsequent to instruction 6 can be rolled back. Alternatively, if no exception occurs, all of the instructions 1-7 can be committed by moving the machine retirement pointer 1331 accordingly.

The latest indicator array 1341, the latest indicator array 1304 and the latest indicator 1333 are used to allow out of order execution. For example, even though instruction 2 loads register R4 before instruction 5, the load from instruction 2 will be ignored once the instruction 5 is ready to occur. The latest load will override the earlier load in accordance with the latest indicator.

In the event of a branch prediction or exception occurring within the reorder buffer and retirement window 1332, a rollback event is triggered. As described above, in the event of a rollback, the unified shadow register file 1301 will rollback to its last committed point and the speculative retirement memory buffer 1342 will be flushed.

Figure 14:
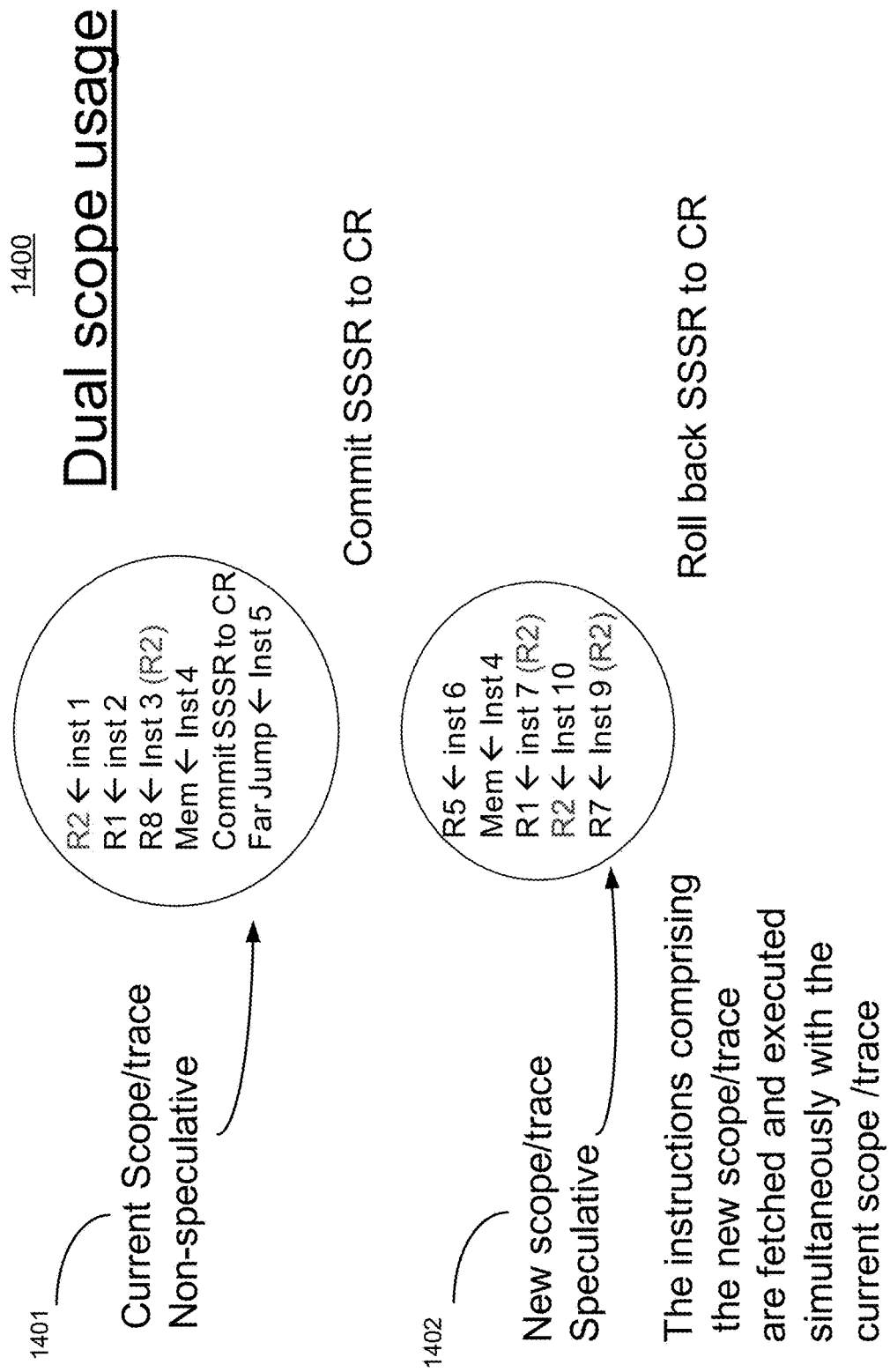
FIG. 14 shows a diagram of the second usage model, including dual scope usage in accordance with one embodiment of the present invention.

FIG. 14 shows a diagram 1400 of the second usage model, including dual scope usage in accordance with one embodiment of the present invention. As described above, this usage model applies to the fetching of 2 threads into the processor, where one thread executes in a speculative state and the other thread executes in the non-speculative state. In this usage model, both scopes are fetched into the machine and are present in the machine at the same time.

As shown in diagram 1400, 2 scope/traces 1401 and 1402 have been fetched into the machine. In this example, the scope/trace 1401 is a current non-speculative scope/trace. The scope/trace 1402 is a new speculative scope/trace. Architecture 1300 enables a speculative and scratch state that allows 2 threads to use those states for execution. One thread (e.g., 1401) executes in a non-speculative scope and the other thread (e.g., 1402) uses the speculative scope. Both scopes can be fetched into the machine and be present at the same time, with each scope set its respective mode differently. The first is non-speculative and the other is speculative. So the first executes in CR/CM mode and the other executes in SR/SM mode. In the CR/CM mode, committed registers are read and written to, and memory writes go to memory. In the SR/SM mode, register writes go to SSSR, and register reads come from the latest write, while memory writes the retirement memory buffer (SMB).

One example will be a current scope that is ordered (e.g., 1401) and a next scope that is speculative (e.g., 1402). Both can be executed in the machine as dependencies will be honored because the next scope is fetched after the current scope. For example, in scope 1401, at the "commit SSSR to CR", registers and memory up to this point are in CR mode while the code executes in CR/CM mode. In scope 1402, the code executes in SR and SM mode and can be rolled back if an exception happens. In this manner, both scopes execute at the same time in the machine but each is executing in a different mode and reading and writing registers accordingly.

Figure 15:
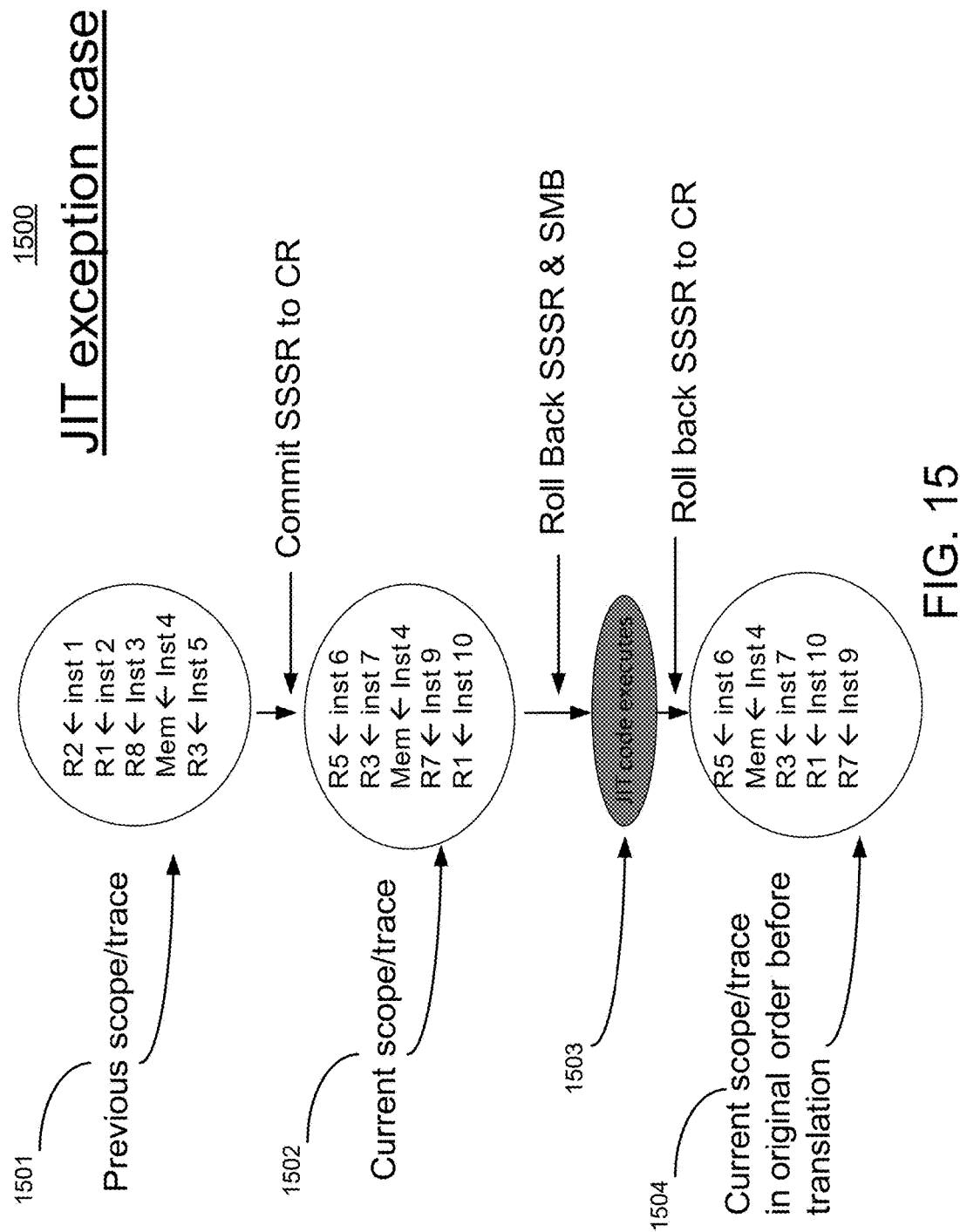
FIG. 15 shows a diagram of the third usage model, including transient context switching without the need to save and restore a prior context upon returning from the transient context in accordance with one embodiment of the present invention.

FIG. 15 shows a diagram 1500 of the third usage model, including transient context switching without the need to save and restore a prior context upon returning from the transient context in accordance with one embodiment of the present invention. As described above, this usage model applies to context switches that may occur for a number of reasons. One such reason could be, for example, the precise handling of exceptions via an exception handling context.

In the 3rd usage model occurs when the machine is executing translated code and it encounters a context switch (e.g., exception inside of the translated code or if translation for subsequent code is needed). In the current scope (e.g., prior to the exception), SSSR and the SMB have not yet committed their speculative state to the guest architecture state. The current state is running in SR/SM mode. When the exception occurs the machine switches to an exception handler (e.g., a convertor) to take care of exception precisely. A rollback is inserted, which causes the register state to roll back to CR and the SMB is flushed. The convertor code will run in SR/CM mode. During execution of convertor code the SMB is retiring its content to memory without waiting for a commit event. The registers are written to SSSR without updating CR. Subsequently, when the convertor is finished and before switching back to executing converted code, it rolls back the SSSR (e.g., SSSR is rolled back to CR). During this process the last committed Register state is in CR.

This is shown in diagram 1500 where the previous scope/trace 1501 has committed from SSSR into CR. The current scope/trace 1502 is speculative. Registers and memory and this scope are speculative and execution occurs under SR/SM mode. In this example, an exception occurs in the scope 1502 and the code needs to be re-executed in the original order before translation. At this point, SSSR is rolled back and the SMB is flushed. Then the JIT code 1503 executes. The JIT code rolls back SSSR to the end of scope 1501 and flushes the SMB. Execution of the JIT is under SC/CM mode. When the JIT is finished, the SSSR is rolled back to CR and the current scope/trace 1504 then re-executes in the original translation order in CR/CM mode. In this manner, the exception is handled precisely at the exact current order.

Figure 16:
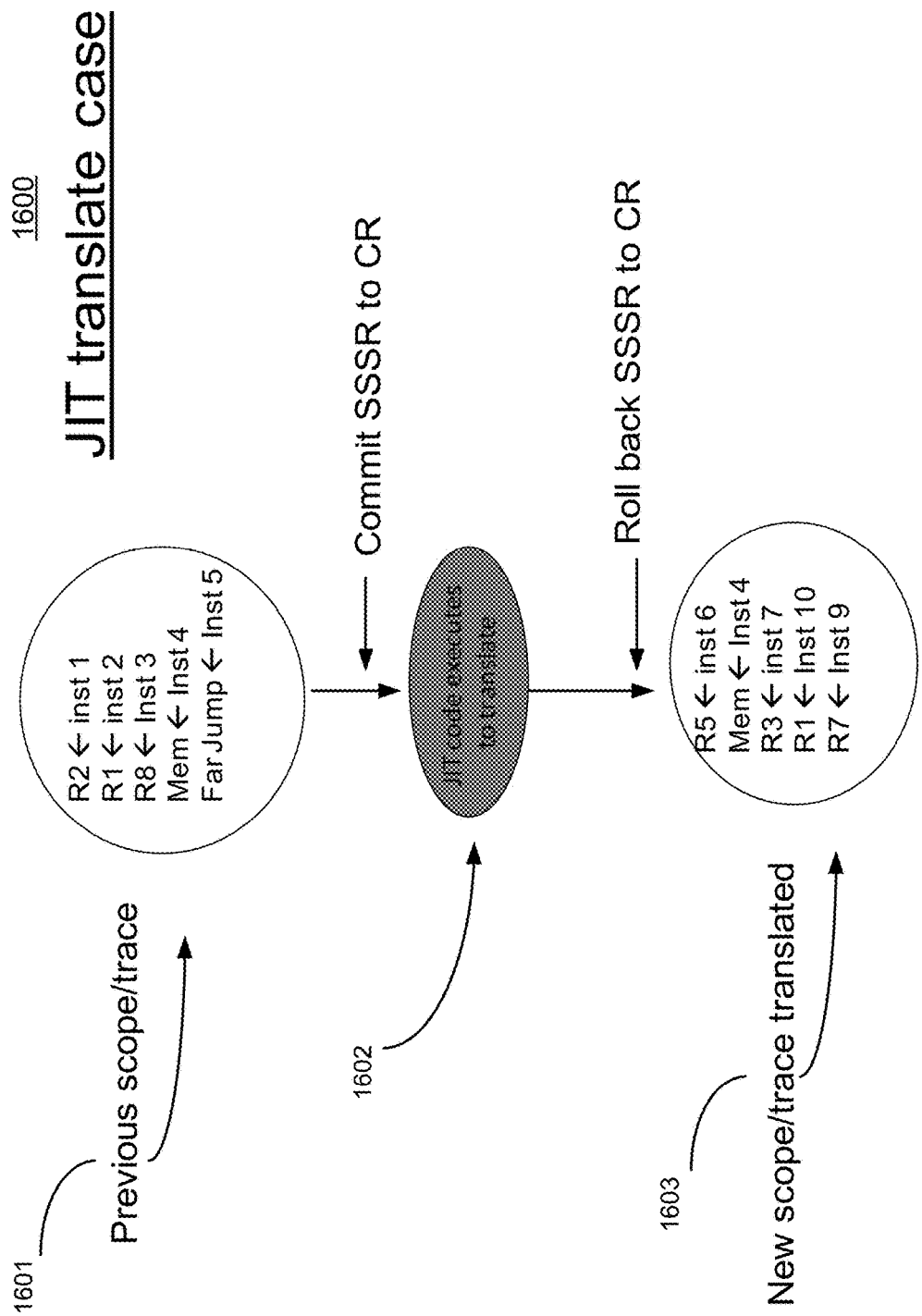
FIG. 16 shows an diagram depicting a case where the exception in the instruction sequence is because translation for subsequent code is needed in accordance with one embodiment of the present invention.

FIG. 16 shows a diagram 1600 depicting a case where the exception in the instruction sequence is because translation for subsequent code is needed in accordance with one embodiment of the present invention. As shown in diagram 1600, the previous scope/trace 1601 concludes with a far jump to a destination that is not translated. Before jumping to a far jump destination, SSSR is committed to CR. The JIT code 1602 then executes to translate the guess instructions at the far jump destination (e.g., to build a new trace of native instructions). Execution of the JIT is under SR/CM mode. At the conclusion of JIT execution, the register state is rolled back from SSSR to CR, and the new scope/trace 1603 that was translated by the JIT begins execution. The new scope/trace continues execution from the last committed point of the previous scope/trace 1601 in the SR/SM mode.

Figure 17:
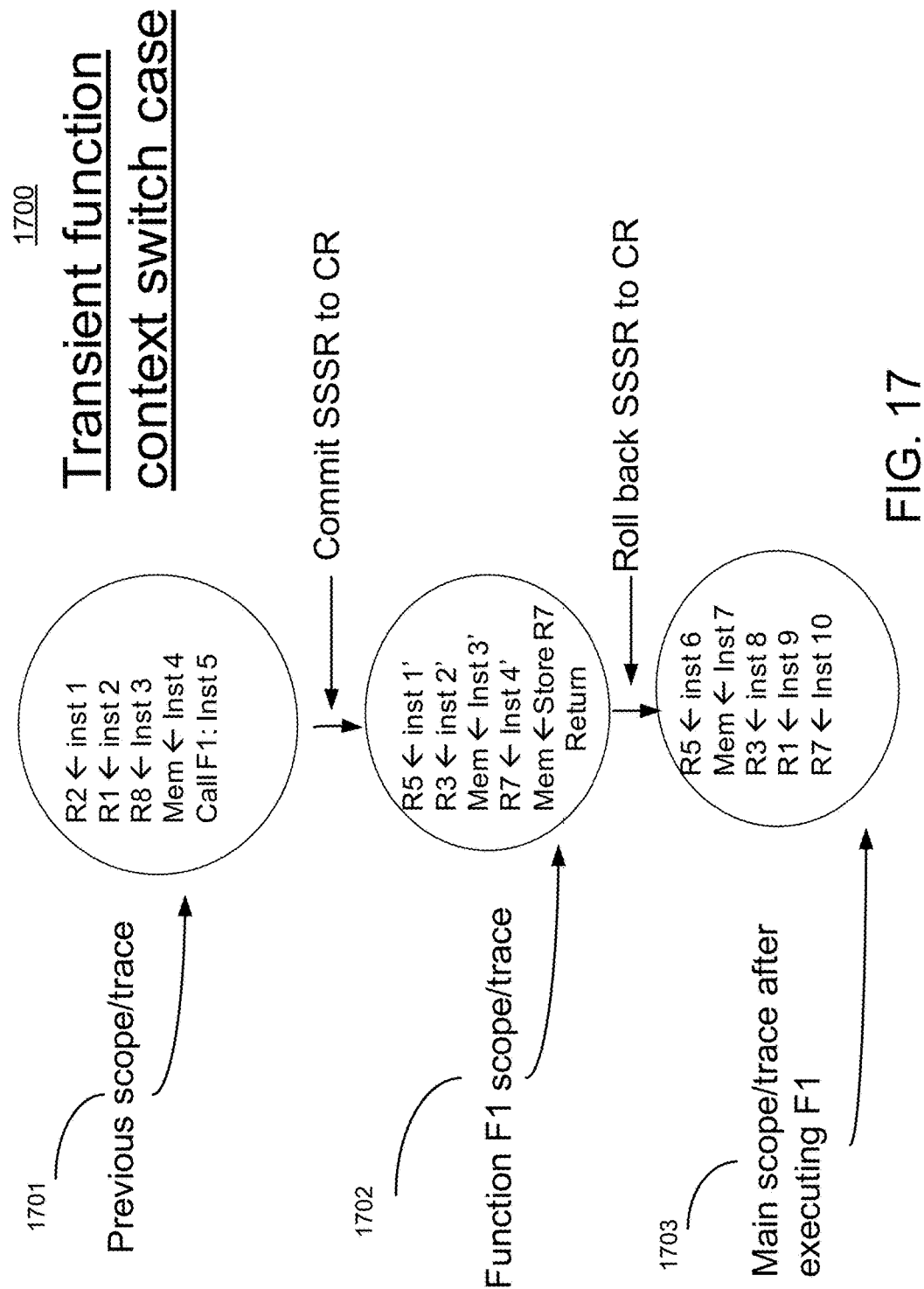
FIG. 17 shows a diagram of the fourth usage model, including transient context switching without the need to save and restore a prior context upon returning from the transient context in accordance with one embodiment of the present invention.

FIG. 17 shows a diagram 1700 of the fourth usage model, including transient context switching without the need to save and restore a prior context upon returning from the transient context in accordance with one embodiment of the present invention. As described above, this usage model applies to context switches that may occur for a number of reasons. One such reason could be, for example, the processing inputs or outputs via an exception handling context.

Diagram 1700 shows a case where a previous scope/trace 1701 executing under CR/CM mode ends with a call of function F1. Register state up to that point is committed from SSSR to CR. The function F1 scope/trace 1702 then begins executing speculatively under SR/CM mode. The function F1 then ends with a return to the main scope/trace 1703. At this point, the register state is rollback from SSSR to CR. The main scope/trace 1703 resumes executing in the CR/CM mode.

Figure 18:
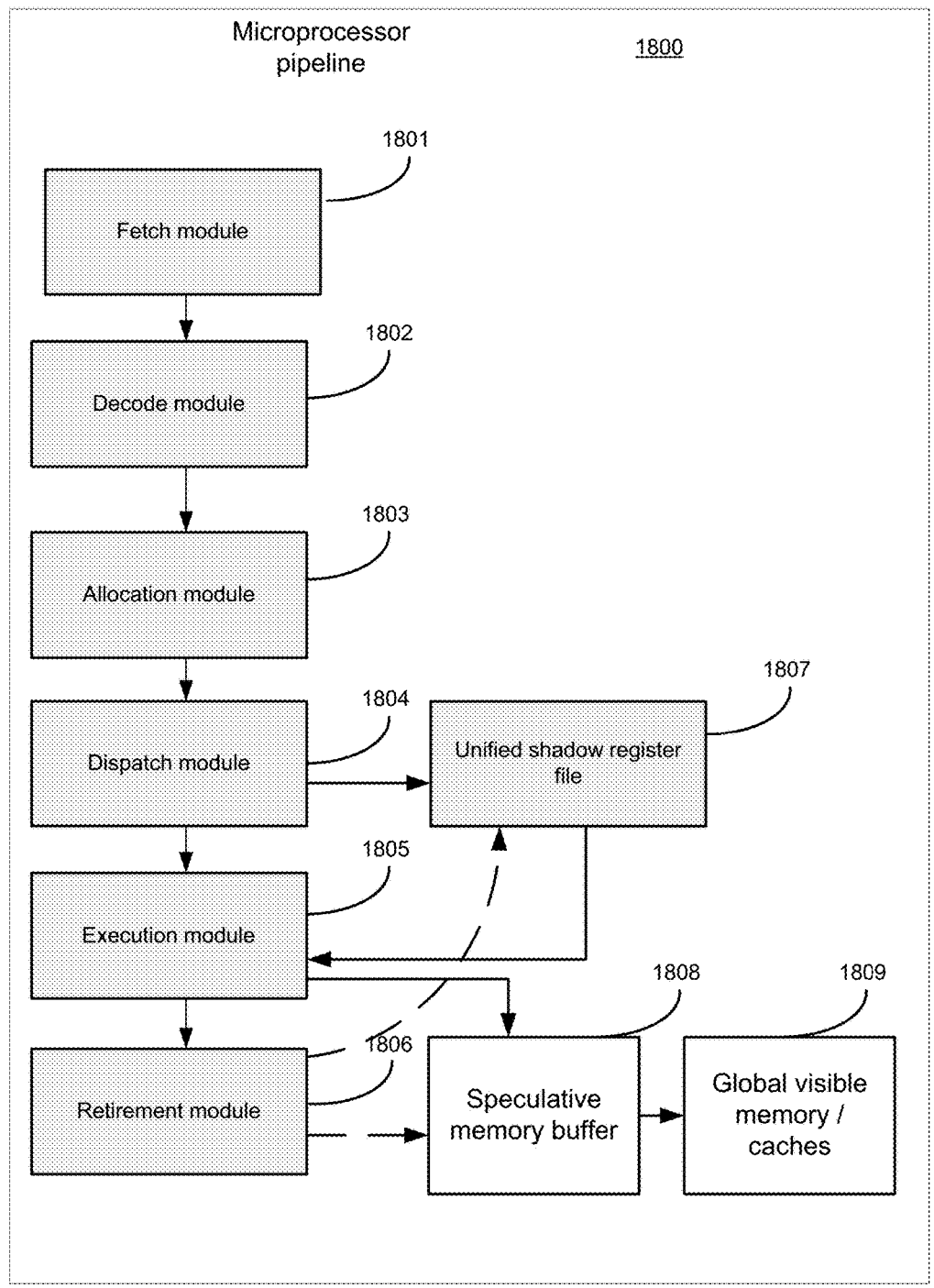
FIG. 18 shows a diagram of an exemplary microprocessor pipeline in accordance with one embodiment of the present invention.

FIG. 18 shows a diagram of an exemplary microprocessor pipeline 1800 in accordance with one embodiment of the present invention. The microprocessor pipeline 1800 includes a hardware conversion accelerator 1810 that implements the functionality of the hardware acceleration conversion process, as described above. In the FIG. 18 embodiment, the hardware conversion accelerator 1810 is coupled to a fetch module 1801 which is followed by a decode module 1802, an allocation module 1803, a dispatch module 1804, an execution module 1805 and a retirement modules 1806. It should be noted that the microprocessor pipeline 1800 is just one example of the pipeline that implements the functionality of embodiments of the present invention described above. One skilled in the art would recognize that other microprocessor pipelines can be implemented that include the functionality of the decode module described above.

The foregoing description, for the purpose of explanation, has been described with reference to specific embodiments. However, the illustrated discussions above are not intended to be exhaustive or to limit the invention to the precise forms disclosed. Many modifications and variations are possible in view of the above teachings. Embodiments were chosen and described in order to best explain the principles of the invention and its practical applications, to thereby enable others skilled in the art to best utilize the invention and various embodiments with various modifications as may be suited to the particular use contemplated.

What is claimed is:

1. A method for managing mappings of storage on a code cache for a processor, comprising:

storing a plurality of guest far branch address to native address mappings as entries in a conversion look aside buffer, wherein the entries indicate addresses of guest far branches that have corresponding converted native addresses stored within a code cache memory, wherein the corresponding native addresses comprise addresses for target blocks of converted native instructions corresponding to the guest far branches, wherein each of the guest far branches is within a guest block, which includes a plurality of instructions, wherein an address for a target block resides outside a current block of a native instruction for a corresponding guest far branch;

receiving a subsequent request for a guest far branch address at the conversion look aside buffer;

indexing the conversion look aside buffer using the guest far branch address to determine whether there exists an entry in the conversion look aside buffer that corresponds to the index; and upon a hit on the index, accessing the corresponding entry to retrieve a pointer that indicates where in the code cache memory a corresponding block of converted native instructions reside;

wherein the code cache memory comprises a plurality of chunks, wherein a chunk comprises a unit of memory having a size correspondinq to a size of the block of converted native instructions; and wherein the plurality of chunks have a plurality of different sizes depending on different sizes of a plurality of corresponding converted native instruction blocks.

2. The method of claim 1, further comprising:
fetching the corresponding block of converted native instructions from the code cache memory for execution.

3. The method of claim 1, wherein the code cache memory is allocated in a set of fixed size chunks, wherein the chunks can be of different types and wherein a different size is allocated for each chunk type.

4. The method of claim 1, wherein the conversion look aside buffer stores a plurality of guest address tags in at least 2 ways, wherein each way is associated with a tag.

5. The method of claim 4, wherein on a hit in the conversion look aside buffer, a pointer corresponding to the index is returned, wherein the pointer is used to index the code cache memory.

6. The method of claim 4, wherein the code cache memory is organized to have a way structure that matches the conversion look aside buffer way structuring to implement a one-to-one mapping.

7. The method of claim 1, wherein the conversion look aside buffer comprises a cache, wherein upon the occurrence of a miss, higher hierarchies of memory can be checked for a hit.

8. The method of claim 7, wherein the higher hierarchies of memory include L1 cache, L2 cache, and system memory.

9. A system for managing mappings of storage on a code cache for a processor, comprising:
a conversion look aside buffer to store a plurality of guest address to native address mappings as entries, wherein the entries indicate addresses of guest far branches that have corresponding converted native addresses stored within a code cache memory, wherein the corresponding native addresses comprise addresses for target blocks of converted native instructions corresponding to the guest far branches, wherein each of the guest far branches is within a guest block, which includes a plurality of instructions, wherein an address for a target block resides outside a current block of a native instruction for a corresponding guest far branch,
wherein upon receiving a subsequent request for a guest far branch address at the conversion look aside buffer, the conversion look aside buffer is to index the entries using the guest far branch to determine whether there exists an entry in the conversion look aside buffer that corresponds to the index,
wherein upon a hit on the index, the conversion look aside buffer is to access the corresponding entry to retrieve a pointer that indicates where in the code cache memory a corresponding block of converted native instructions reside; and
logic to fetch the corresponding block of converted native instructions from the code cache memory for execution,
wherein the conversion look aside buffer is to store a plurality of guest address tags in at least 2 ways, wherein each way is associated with a tag, and
wherein the code cache memory is organized to have a way structure that matches the conversion look aside buffer way structuring to implement a one-to-one mapping.

10. The system of claim 9, wherein the code cache memory comprises a plurality of chunks, wherein a chunk comprises a unit of memory having a size corresponding to a size of the block of converted native instructions.

11. The system of claim 10, wherein the plurality of chunks have a plurality of different sizes depending on different sizes of a plurality of corresponding converted native instruction blocks.

12. The system of claim 11, wherein the code cache memory is allocated in a set of fixed size chunks, wherein the chunks can be of different types and wherein a different size is allocated for each chunk type.

13. The system of claim 9, wherein on a hit in the conversion look aside buffer, a pointer corresponding to the index is returned, wherein the pointer is used to index the code cache memory.

14. The system of claim 9, wherein the conversion look aside buffer comprises a cache, wherein upon the occurrence of a miss, higher hierarchies of memory can be checked for a hit.

15. The system of claim 14, wherein the higher hierarchies of memory include L1 cache, L2 cache, and system memory.

* * * * *